United States Patent
Gawlas et al.

(10) Patent No.: US 12,014,338 B2
(45) Date of Patent: Jun. 18, 2024

(54) DEVICE FOR DIRECTLY TRANSMITTING ELECTRONIC COIN DATA RECORDS TO ANOTHER DEVICE, AND PAYMENT SYSTEM

(71) Applicant: GIESECKE+DEVRIENT ADVANCE52 GMBH, Munich (DE)

(72) Inventors: Florian Gawlas, Munich (DE); Tilo Fritzhanns, Munich (DE); Wolfram Seidemann, Munich (DE); Verena Rapp, Munich (DE); Maria Veleva, Munich (DE)

(73) Assignee: GIESECKE+DEVRIENT ADVANCE52 GMBH, Munich (DE)

( * ) Notice: Subject to any disclaimer, the term of this patent is extended or adjusted under 35 U.S.C. 154(b) by 204 days.

(21) Appl. No.: 17/604,171

(22) PCT Filed: Apr. 14, 2020

(86) PCT No.: PCT/EP2020/060434
§ 371 (c)(1),
(2) Date: Oct. 15, 2021

(87) PCT Pub. No.: WO2020/212331
PCT Pub. Date: Oct. 22, 2020

(65) Prior Publication Data
US 2022/0207500 A1    Jun. 30, 2022

(30) Foreign Application Priority Data
Apr. 15, 2019   (DE) ............ 10 2019 002 731.0

(51) Int. Cl.
*G06Q 20/06*    (2012.01)
*G06Q 20/02*    (2012.01)
(Continued)

(52) U.S. Cl.
CPC ..... *G06Q 20/0658* (2013.01); *G06Q 20/3825* (2013.01); *H04L 9/008* (2013.01);
(Continued)

(58) Field of Classification Search
CPC .......... G06Q 20/0658; G06Q 20/3825; G06Q 20/10; G06Q 2220/00; G06Q 20/02;
(Continued)

(56) References Cited

U.S. PATENT DOCUMENTS 6,446,052 B1 * 9/2002 Juels ............... G06Q 20/10
705/69
10,873,447 B2 * 12/2020 Wagner ............ G06Q 20/401
(Continued)

FOREIGN PATENT DOCUMENTS

| CN | 109257182 A | 1/2019 |
| DE | 102009034436 A1 | 1/2011 |

(Continued)

OTHER PUBLICATIONS

Sammy Gaur, Transferring Files Between Two Devices Without Internet, Aug. 19, 2016 (Year: 2016).*
(Continued)

*Primary Examiner* — Clifford B Madamba
(74) *Attorney, Agent, or Firm* — Workman Nydegger

(57) ABSTRACT

A device for directly transmitting electronic coin data records to another device includes accessing data storage, such that an electronic coin data record is stored in the data storage; an interface at least for outputting the at least one electronic coin data record to the other device; and a computing unit configured to mask the electronic coin data record in the device by applying a homomorphic encryption function to the electronic coin data record to obtain a masked electronic coin data record for registering the masked electronic coin data record at a monitoring entity; and to output (Continued)

the electronic coin data record using the interface. A payment system has a monitoring layer including a database in which masked electronic coin data records are stored; and a direct transaction layer including at least two devices in which the method can be carried out.

23 Claims, 13 Drawing Sheets

(51) Int. Cl.
<table>
<tr><td>G06Q 20/10</td><td>(2012.01)</td></tr>
<tr><td>G06Q 20/22</td><td>(2012.01)</td></tr>
<tr><td>G06Q 20/32</td><td>(2012.01)</td></tr>
<tr><td>G06Q 20/38</td><td>(2012.01)</td></tr>
<tr><td>H04L 9/00</td><td>(2022.01)</td></tr>
<tr><td>H04L 9/32</td><td>(2006.01)</td></tr>
</table>

(52) U.S. Cl.
CPC ...... *H04L 2209/04* (2013.01); *H04L 2209/42* (2013.01); *H04L 2209/56* (2013.01)

(58) Field of Classification Search
CPC ............. G06Q 20/3229; G06Q 20/223; G06Q 20/3827; H04L 9/008; H04L 2209/04; H04L 2209/42; H04L 2209/56; H04L 9/3218; H04L 9/3239; H04L 9/50
USPC .......................................................... 705/44
See application file for complete search history.

(56) References Cited

U.S. PATENT DOCUMENTS

| | | | | |
|---|---|---|---|---|
| 11,062,303 | B2* | 7/2021 | Maxwell | .................. H04L 9/50 |
| 2014/0074719 | A1 | 3/2014 | Gressel et al. | |
| 2015/0380761 | A1* | 12/2015 | Watanabe | ........... H01M 8/2404 |
| | | | | 29/730 |
| 2016/0247131 | A1 | 8/2016 | Ahmed et al. | |
| 2016/0335628 | A1* | 11/2016 | Weigold | ............... G06Q 20/065 |
| 2016/0358165 | A1 | 12/2016 | Maxwell | |
| 2016/0380761 | A1* | 12/2016 | Dow | .................. H04L 63/0428 |
| | | | | 380/28 |
| 2017/0132630 | A1 | 5/2017 | Castinado et al. | |
| 2017/0236094 | A1 | 8/2017 | Shah | |
| 2018/0268382 | A1 | 9/2018 | Wasserman | |
| 2019/0102756 | A1 | 4/2019 | Zhou et al. | |
| 2019/0228386 | A1 | 7/2019 | Onnainty | |

FOREIGN PATENT DOCUMENTS

| | | |
|---|---|---|
| DE | 102009038645 A1 | 3/2011 |
| EP | 0772165 A2 | 5/1997 |
| WO | 2016200885 A1 | 12/2016 |
| WO | 2019072264 A2 | 4/2019 |
| WO | 2019072277 A2 | 4/2019 |
| WO | 2019072278 A2 | 4/2019 |

OTHER PUBLICATIONS

Non-Final Office Action for Co-pending U.S. Appl. No. 17/594,419, filed Sep. 28, 2023.

International Search Report and Written Opinion from PCT Application No. PCT/EP2020/060434, Jul. 23, 2020.

German Search Report from Corresponding DE Application No. 102019002731.0, Dec. 22, 2020.

Poelstra et al., "Confidential Assets," Springer International Publishing, Feb. 10, 2019, pp. 43-63.

* cited by examiner

| Command | $O_1$ | $O_2$ | $S_1$ | $S_2$ | Signature | O flag | C flag | R flag | S flag |
|---|---|---|---|---|---|---|---|---|---|
| Create | - | - | $Z_i$ | - | $[Z_i]Sig_I$ | - | - | - | [0,1] |
| Deactivate | $Z_i$ | - | - | - | $[Z_i]Sig_I$ | [0,1] | - | - | [0,1] |
| Split | $Z_i$ | - | $Z_j$ | $Z_k$ | - | [0,1] | [0,1] | [0,1] | - |
| Join | $Z_i$ | $Z_j$ | - | $Z_m$ | - | [0,1] | [0,1] | [0,1] | - |
| Switch | $Z_k$ | - | - | $Z_l$ | - | [0,1] | [0,1] | [0,1] | - |

Fig. 2

DEVICE FOR DIRECTLY TRANSMITTING ELECTRONIC COIN DATA RECORDS TO ANOTHER DEVICE, AND PAYMENT SYSTEM

TECHNICAL FIELD OF THE INVENTION

The invention relates to a device for directly transmitting electronic coin data records to another device. The invention also relates to a payment system for exchanging monetary amounts.

TECHNICAL BACKGROUND OF THE INVENTION

Security of payment transactions and the associated payment transaction data means protection of the confidentiality of the data exchanged; as well as protection of the integrity of the data exchanged; as well as protection of the availability of the exchanged data.

Conventional blockchain-based payment transactions, such as Bitcoin, represent a high level of protection of integrity. When electronic coin data records, also known as "coins", change hands in a blockchain technology, a lot of information is published. Thus, such payment transactions and in particular the data exchanged, are not completely confidential. In addition, the payment transactions are very computationally intensive and therefore energy consuming.

Therefore, instead of the confidential data, only the hash values of the confidential data are conventionally stored in a blockchain ledger. The corresponding plain text data must then be managed outside the blockchain. Such concepts have so far not been applicable to electronic coin data records because they do not have basic control functions, in particular (1) the recognition of methods of multiple spending, also known as double spending, and (2) the recognition of uncovered payments. In case (1) someone tries to output the same coin data record multiple times and in the second case someone tries to output a coin data record even though he or she has no credit (anymore).

From DE 10 2009 038 645 A1 and DE 10 2009 034 436 A1, systems for transmitting monetary amounts in the form of electronic data records are known, wherein payment with duplicates of the data record is prevented and a high degree of manipulation security is provided while complex structures and complex encryption and signing processes are required for the exchange. These systems turned out to be of little practical use.

WO 2016/200885 A1 describes a method for encrypting an amount transacted in a blockchain ledger, wherein the verifiability of the transaction is retained. A concealment amount is added to an input value. Then an output value is generated and encrypted. Both the input value and the output value are within a range of values, with a sum of any two values within the range not exceeding a threshold value. The sum of the encrypted input value and the encrypted output value may be zero. Range checks, so-called range proofs, are associated with each of the input values and the output value. These range checks prove that the input value and output value fall within the range of values. Every public key may be signed with a ring signature based on a public key of a recipient in the transaction. This process requires blockchain technology, which must be called after receiving a coin data record in order to validate the coin data record.

It is the object of the present invention to provide a method and a system wherein a payment transaction is configured to be secure but simple. In particular, anonymous direct payment between devices such as tokens, smartphones, but also machines such as point-of-sale terminals or vending machines is to be provided. The coin data records are to be usable immediately after receipt, for example to enable payment even without a network connection. It is intended, that a plurality of coin data records can be combined with one another and/or split as desired by the user in order to enable flexible exchange. The exchanged coin data records should on the one hand be confidential to other system participants, but on the other hand allow each system participant to carry out basic checks, in particular the recognition of multiple spending attempts and the recognition of attempts to pay with non-existent amounts.

SUMMARY OF THE INVENTION

The objects set are achieved by the features of the independent claims. Further advantageous developments are described in the dependent claims.

The object is achieved in particular by a method for directly transmitting electronic coin data records between terminals, wherein a first terminal to a second terminal, wherein the first terminal has at least one electronic coin data record, said method comprising the following steps: transmitting the electronic coin data record from the first terminal to a second terminal, the at least one electronic coin data record including at least a monetary amount and a concealment amount; receiving the electronic coin data record from the first terminal as a transmitted electronic coin data record in the second terminal; and generating a further electronic coin data record using the transmitted electronic coin data record.

Generating the further electronic coin data record is preferably performed by switching the transmitted electronic coin data record to the further electronic coin data record, namely the electronic coin data record to be switched; and/or splitting the transmitted electronic coin data record into at least two further electronic partial coin data records; and/or joining the transmitted electronic coin data record with at least one second electronic coin data record to form the further electronic coin data record, namely the joined electronic coin data record.

The method further comprises the steps of: masking the further electronic coin data record in the second terminal by applying a homomorphic one-way function to the further electronic coin data record to obtain a masked electronic coin data record; and registering the masked (further) electronic coin data record in a remote monitoring entity.

The steps described here do not have to be carried out in the order described. However, the sequence described here is a preferred embodiment.

The step of registering is preferably carried out when the devices are connected to the monitoring entity. In an alternative, the steps described may also be carried out without the step of registering being carried out in the monitoring entity.

When switching the transmitted coin data record, in one embodiment, the monetary amount of the transmitted electronic coin data record from the first terminal corresponds to the monetary amount of the further electronic coin data record. When splitting the transmitted electronic coin data record, in one embodiment, the monetary amount of the transmitted electronic coin data record corresponds to the total monetary amount of the further electronic coin partial data records created from the transmitted electronic coin data record. When joining, in one embodiment, the total monetary amount of the transmitted electronic coin data record and the second electronic coin data record corresponds to the monetary amount of the joined electronic coin data record.

Accordingly, a registration request sent by the terminal to the monitoring entity (such as a command to switch, join or split) preferably comprises:
exactly one masked electronic coin data record to be registered and exactly one registered masked electronic coin data record, or
at least two masked split modified electronic coin data records to be registered (and the masked received electronic coin data record), or
at least two registered masked electronic coin records (one of which is the masked received electronic coin record and the masked joined electronic coin record).

The terminal sends the registration request to the monitoring entity, which stores valid masked electronic coin data records for electronic coin data records. Terminals may check the validity of an electronic coin data record—in particular the received one—alternatively or additionally (for example before further use) by sending the masked electronic coin data record to the monitoring entity in a validity request. The monitoring entity responds to the validity request (positive or negative) based on the stored valid masked electronic coin data records.

An electronic coin data record is, in particular, an electronic data record that represents a value of money (=monetary amount) and is colloquially referred to as "digital coin" or "electronic coin". In the method, this monetary amount switches from a first terminal to another terminal. In the following, a monetary amount is understood to be a digital amount that can be credited to an account of a financial institution, for example, or can be exchanged for another means of payment. Therefore, an electronic coin data record represents cash in electronic form.

The terminal may have a plurality of electronic coin data records; for example, the plurality of coin data records may be stored in a data storage of the terminal. The data storage then represents, for example, an electronic wallet. The data storage may be internal, external or virtual, for example. In one embodiment, when an electronic data record is received, a "joining" ma be carried out automatically so that preferably only one (or a certain number of) electronic data records are in the terminal.

The terminal may, for example, be a passive device, such as a token, a mobile device such as a smartphone, a tablet computer, a computer, a server or a machine.

An electronic coin data record for transmitting monetary amounts differs significantly from an electronic data record for data exchange or data transfer since, for example, a classic data transaction is executed on the basis of a question-and-answer principle or on intercommunication between the data transfer partners. An electronic coin data record, on the other hand, is unique, unambiguous and exists in the context of a security concept which may include signatures or encryptions, for example. In principle, an electronic coin data record contains all data that are required for a receiving entity with regard to verification, authentication and forwarding to other entities. Therefore, intercommunication between the terminals during the exchange is basically not necessary with this type of data record.

According to the invention, an electronic coin data record to be used for transmission between two terminals includes a monetary amount, that is a datum which represents a monetary value of the electronic coin data record, and a concealment amount, for example a random number. In addition, the electronic coin data record may include further metadata, for example which currency the monetary amount represents. An electronic coin data record is uniquely represented by these at least two data (monetary amount and concealment amount). Anyone who has access to these two data of a valid coin data record can use this electronic coin data record for payment. Knowing these two values (monetary amount and concealment amount) is therefore equivalent to owning digital money. This electronic coin data record is transmitted directly between two terminals. In one embodiment of the invention, an electronic coin data record consists of these two data so that only the transmittance of the monetary amount and the concealment amount is necessary for exchanging digital money.

A corresponding masked electronic coin data record is associated with each electronic coin data record. The knowledge of a masked electronic coin data record does not allow someone to dispense the digital money represented by the electronic coin data record. This represents an essential difference between masked electronic coin data records and (unmasked) electronic coin data records and is the gist of the present invention. The masked electronic coin data record is unique and can be clearly associated with an electronic coin data record, i.e. in a 1-to-1 relationship. The electronic coin data record is preferably masked by a computing unit of the terminal within the terminal which also has the at least one electronic coin data record. Alternatively, the masking can be carried out by a computing unit of the terminal which receives the electronic coin data record.

This masked electronic coin data record is obtained by applying a homomorphic one-way function, in particular a homomorphic cryptographic function. This function is a one-way function, i.e. a mathematical function that is "easy" to calculate in terms of complexity theory, but "difficult" to practically impossible to reverse. Here, a one-way function is also referred to as a function for which no reversal that can be practically carried out in a reasonable time and with reasonable effort is known. The calculation of a masked electronic coin data record from an electronic coin data record is thus comparable to the generation of a public key in an encryption method using a residue class group. Preferably, a one-way function is used which operates on a group in which the discrete logarithm problem is difficult to solve, such as a cryptographic method analogous to elliptical curve cryptography, ECC for short, from a private key of a corresponding cryptography method. The inverse function, i.e. the generation of an electronic coin data record from a masked electronic coin data record, is very time-consuming—equivalent to generating the private key from a public key in an encryption method over a residue class group. When sums and differences or other mathematical operations are mentioned in the present document, these are to be understood in the mathematical sense as the respective operations on the corresponding mathematical group, for example the group of points on an elliptical curve.

The one-way function is homomorphic, i.e. a cryptographic method that has homomorphic properties. Thus, mathematical operations can be carried out with the masked electronic coin data record and also be carried out in parallel on the (unmasked) electronic coin data record and therefore be reproduced. With the help of the homomorphic one-way function, calculations with masked electronic coin data records can be reproduced in the monitoring entity without the corresponding (unmasked) electronic coin data records being known there. Therefore, certain calculations with electronic coin data records, for example for processing the (unmasked) electronic coin data record (e.g., splitting or joining) can also be verified in parallel with the associated masked electronic coin data records, e.g. for validation checks or to check the legality of the respective electronic coin data record. The homomorphism properties apply at least to addition and subtraction operations so that splitting or combining (=joining) electronic coin data records can also be recorded in the monitoring entity by means of the correspondingly masked electronic coin data records and can be reproduced by end devices that are requesting and/or by the monitoring entity without knowing the monetary amount and the terminal that is executing.

The homomorphism property therefore makes it possible to record valid and invalid electronic coin data records on the basis of their masked electronic coin data records in a monitoring entity without knowledge of the electronic coin data records even if these electronic coin data records are processed (split, joined, switched). This ensures that no additional monetary amount has been created or that an identity of the terminal is recorded in the monitoring entity. Masking thus allows for a high level of security without giving any insight into the monetary amount or the terminal. This results in a two-layer payment system. On the one hand, there is the processing layer in which masked electronic data records are checked and, on the other hand, there is the direct transaction layer in which at least two terminals transmit electronic coin data records.

While the electronic coin data records are used for direct payment between two terminals, the masked coin data records are registered in the monitoring entity.

The step of switching the transmitted electronic coin data record comprises the following sub-steps: generating an electronic coin data record to be switched in the second terminal from the transmitted coin data record, wherein a concealment amount for the electronic coin data record to be switched is generated in the second terminal using a transmitted concealment amount of the transmitted electronic coin data record; and the transmitted monetary amount of the transmitted electronic coin data record is used as the monetary amount for the electronic coin data record to be switched.

When the electronic coin data record is transmitted from the first terminal to the second terminal, two terminals thus have knowledge of the electronic coin data record. In order to prevent the first terminal that is sending from also using the electronic coin data record for payment at another (third) terminal, the transmitted electronic coin data record is switched from the first terminal to the second terminal. Switching may preferably be carried out automatically when an electronic coin data record is received. In addition, it may also be done on request, for example at a command from the first and/or second terminal.

In a preferred embodiment, generating comprises creating a concealment amount for the electronic coin data record to be switched, preferably using the concealment amount of the transmitted electronic coin data record in conjunction with a new concealment amount, for example a random number. Preferably, the concealment amount of the electronic coin data record to be switched is obtained as the sum of the concealment amount of the transmitted electronic coin data record and the random number that serves as the new, i.e. additional, concealment amount. Furthermore, the monetary amount of the transmitted electronic coin data record is preferably used as the monetary amount for the electronic coin data record to be switched. Thus, no further money is generated and the monetary amounts of both coin data records are identical.

Registering after the switching step results in the electronic coin data record sent by the first terminal to become invalid and to be accordingly recognized as invalid in a second attempt to spend by the first terminal. The (further) coin data record generated by the second terminal becomes valid after the checks have been successfully completed.

When switching, also referred to as "switch", the electronic coin data record received from the first terminal results in a new electronic coin data record, preferably with the same monetary amount, the so-called electronic coin data record to be switched. The new electronic coin data record is generated by the second terminal, preferably by using the monetary amount of the received electronic coin data record as the monetary amount of the electronic coin data record to be switched. A new concealment amount, for example a random number, is generated. After switching, the electronic coin data record received and the electronic partial coin data record to be switched are preferably masked in the terminal by applying the homomorphic one-way function to the electronic coin data record received and the electronic partial coin data record to be switched in order to accordingly obtain a masked electronic coin data record received and a masked electronic partial coin data record to be switched. Furthermore, additional information that is required for registering the switch of the masked electronic coin data record in the remote monitoring entity is preferably calculated in the terminal. The additional information preferably includes a range proof for the masked electronic coin data record to be switched and a range proof for the masked electronic coin record received. The range proof is proof that the monetary value of the electronic coin data record is not negative, the electronic coin data record is validly created and/or the monetary value and the concealment amount of the electronic coin data record are known to the creator of the range proof. In particular, the range proof serves to provide said proof(s) without revealing the monetary value and/or the concealment amount of the masked electronic coin data record. These range proofs are also called "zero knowledge range proofs". Ring signatures are preferably used as range proof. The switch of the masked electronic coin data record is then registered in the remote monitoring entity.

This switching is necessary in order to invalidate (make invalid) the electronic coin data record received from the first terminal in order to avoid double spending. Because, as long as the electronic coin data record has not been switched, the first terminal can pass this received electronic coin data record to a third device since the first terminal has knowledge of the electronic coin data record and is therefore still in possession of it. Switching is made secure, for example, by adding a new concealment amount to the concealment amount of the electronic coin data record received, thereby obtaining a concealment amount that only the second terminal knows. Newly created concealment amounts must have high entropy since they are used as a dazzle factor for the corresponding masked electronic partial coin data records. Preferably, a random number generator on the terminal is used for this purpose. This protection can be tracked in the monitoring entity.

In a further preferred embodiment of the method, the at least one electronic coin data record is intended to be split into the first electronic partial coin data record and the second electronic partial coin data record. Splitting is preferably carried out, on the one hand, by determining a partial monetary amount and a partial concealment amount for the first electronic coin data record (each between 0 and the received monetary amount or concealment amount) and, on the other hand, by calculating the monetary amount of the second electronic partial coin data record as the difference between the received monetary amount and the partial monetary amount of the first electronic partial coin data record and calculating the concealment amount of the second electronic partial coin data record as the difference between the received concealment amount and the partial concealment amount of the first electronic partial coin data record. After the split, the electronic coin data record to be split, the first electronic partial coin data record and the second electronic partial coin data record are masked in the first and/or second terminal by respectively applying the homomorphic one-way function in order to accordingly obtain a masked electronic coin data record to be split, a masked first electronic partial coin data record and a masked second electronic partial coin data record. Furthermore, additional information that is required for registering the split of the masked electronic coin data record in the remote monitoring entity is calculated in the terminal. The additional information preferably includes a range proof of the masked electronic coin data record to be split, a range proof of the masked first electronic coin data record and a range proof of the masked second electronic coin data record. The range proof is proof that the monetary value of the electronic coin data record is not negative, the electronic coin data record has been validly created and/or the monetary value and the concealment amount of the electronic coin data record are known to the creator of the range proof. In particular, the range proof serves to provide said proof(s) without revealing the monetary value and/or the concealment amount of the masked electronic coin data record. These range proofs are also called "zero knowledge range proofs". Preferably, ring signatures are used as range proof. The split of the masked electronic coin data record is then registered in the remote monitoring entity. In this way, the monetary amounts to be transmitted can be adapted to the corresponding needs. A terminal owner is not forced to always pass the entire monetary amount to another terminal.

Splitting and subsequently registering has the advantage that an owner of the at least one electronic coin data record is not forced to always transmit the entire monetary amount at once, but rather to transmit corresponding partial amounts. The monetary value can be split without restrictions as long as all electronic partial coin data records have a positive monetary amount that is less than the monetary amount of the electronic coin data record from which the split is made, and the sum of the electronic partial coin data records is equal to the electronic partial coin data record to be split. Alternatively or additionally, fixed denominations may be used. Alternatively, the concealment amount may be generated outside the terminal and obtained via a (secure) communication channel. Preferably, a random number generator on the terminal is used for this purpose. In order to keep track of all checks, the monitoring entity may, for example, note the partial steps of the monitoring entity in appropriate places, with markings, called flags, also being set for this purpose in order to document intermediate stages. After successfully completing the checks that are relevant for the split command, that is, if the markings are appropriately complete, the (masked) first electronic partial coin data record and the (masked) second electronic partial coin data record are preferably marked as valid. The (masked) electronic coin data record to be split becomes invalid automatically. Preferably, the monitoring entity communicates the result of executing the split command, i.e. which of the masked electronic coin data records involved are valid after executing the split command, to the "commanding" terminal.

In a further preferred embodiment of the method, in the step of joining electronic coin data records, a further electronic coin data record (joined electronic coin data record) is determined from a first and a second electronic coin data record. The concealment amount for the electronic coin data record to be joined is calculated by forming the sum of the respective concealment amounts of the first and second electronic coin data records. Furthermore, the monetary amount for the connected electronic coin data record is preferably calculated by forming the sum of the respective monetary amounts of the first and the second electronic coin data records.

After joining, the first electronic coin data record, the second electronic coin data record, and the electronic coin data record to be joined are masked in the (first and/or second) terminal by applying the homomorphic one-way function to the first electronic coin data record, the second electronic coin data record, and the electronic coin data record to be joined in order to accordingly obtain a masked first electronic coin data record, a masked second electronic coin data record, and a masked electronic coin data record to be joined. Furthermore, additional information required for registering the joining of the masked electronic coin data records in the remote monitoring entity is calculated in the terminal. Preferably, the additional information includes a range proof of the masked first electronic coin data record and a range proof of the masked second electronic coin data record. The range proof is proof that the monetary value of the electronic coin data record is not negative, the electronic coin data record has been validly created and/or the monetary value and the concealment amount of the electronic coin data record are known to the creator of the range proof. In particular, the range proof serves to provide said proof(s) without revealing the monetary value and/or the concealment amount of the masked electronic coin data record. These range proofs are also called "zero knowledge range proofs". Preferably, ring signatures are used as range proof. The joining of the two masked electronic coin data records is then registered in the remote monitoring entity.

With the step of joining, two electronic coin data records can be combined. The monetary amounts as well as the concealment amounts are added. As with splitting, a validity of the two original coin data records may also be performed when joining.

A main distinguishing feature of this inventive concept from known solutions is that the monitoring entity only (that is, exclusively) keeps knowledge of the masked electronic coin data records and a list of operations on or changes to the masked electronic coin data record. The actual payment transactions are not registered in the monitoring entity and are carried out in a direct transaction layer directly between terminals.

A method in a monitoring entity that stores valid masked electronic coin data records, each of which is formed by applying a homomorphic one-way function to an electronic coin data record, wherein electronic coin data records include a monetary amount and a concealment amount, comprises in particular the steps of:

receiving a registration request comprising at least one masked electronic coin data record to be registered and at least one registered masked electronic coin data record;

checking the registration request received, wherein t is checked whether the registered masked electronic coin data record of the registration request is stored as a valid masked electronic coin data record for transmitting in the monitoring entity, and it is checked whether the masked electronic coin data records of the registration request are monetarily amount-neutral overall; and storing the masked electronic coin data record to be registered as a valid masked electronic coin data record, wherein the registered masked electronic coin data record of the registration request that was previously stored as valid is no longer valid.

Checking the monetary amount neutrality of the registration request (which is possible due to the homomorphic one-way function used) is preferably carried out without knowledge of the amount by forming the difference between the masked electronic coin data records.

In preferred methods, the monitoring entity of monetary amounts of an issuer entity receives creation and/or deactivation requests including at least one masked electronic coin data record created or to be deactivated, in particular for an electronic coin data record newly issued by the issuer entity or an electronic coin data record withdrawn by the issuer entity.

The creation and/or deactivation request for a masked electronic coin data record may include a signature of the issuer for the masked electronic coin data record, wherein the signature of the masked newly created electronic coin data record is preferably stored in the monitoring entity.

An electronic coin data record may become invalid in the monitoring entity by marking or by deleting the corresponding masked electronic coin data record in the monitoring entity. Particularly preferably, the corresponding masked electronic coin data record or the corresponding electronic coin data record is also deactivated in the issuer entity.

According to the invention, a two-layer payment system consisting of a direct payment transaction layer for the direct exchange of (unmasked) electronic coin data records and a monitoring layer, which may also be referred to as a "concealed electronic data record ledger", is provided. Payment transactions are not recorded in the monitoring entity of the checking layer, but only masked electronic coin data records and operations thereon for the purpose of verifying the validity of (unmasked) electronic coin data records. This guarantees the anonymity of the participants in the payment system. The monitoring entity provides information about valid and invalid electronic coin data records, for example to avoid multiple spending of the same electronic coin data record or to verify the authenticity of the electronic coin data record as validly issued electronic money.

The terminal may therefore transmit electronic coin data records to another terminal in the direct payment transaction layer without a connection to the checking entity, in particular when the terminal is offline.

Here, the terminal may have a security element in which the electronic coin data records are securely stored. A security element is preferably a special computer program product, in particular in the form of a secured runtime environment within an operating system of a terminal, called Trusted Execution Environments, TEE, stored on a data storage, for example a mobile terminal, a machine, preferably an ATM. Alternatively, the security element is, for example, formed as special hardware, in particular in the form of a secured hardware platform module, called Trusted Platform Module, TPM, or as an embedded security module, eUICC, eSIM. The security element provides a trusted environment.

The communication between two terminals may be carried out in a wireless or wired, or, for example, also optical manner, preferably via QR code or barcode, and may be configured as a secure channel. The optical manner may include, for example, the steps of generating an optical encoding, in particular a 2D encoding, preferably a QR code, and reading in optical encoding. The exchange of the electronic coin data record is thus secured, for example, by cryptographic keys, for example a session key negotiated for an electronic coin data record exchange or a symmetrical or asymmetrical key pair.

By communicating between terminals, for example via security elements thereof, the exchanged electronic coin data records are protected from theft or manipulation. The security element level thus complements the security of established blockchain technology.

Moreover, it is advantageous that the electronic coin data records can be transmitted in any format. This implies that they can be communicated, that is transmitted, on any channel. They do not need to be saved in a specific format or in a specific program.

In particular, a mobile telecommunication terminal, for example a smartphone, is regarded as a terminal. Alternatively or additionally, the terminal may also be a device such as a wearable, smart card, machine, tool, vending machine or container or vehicle. A terminal according to the invention is therefore either stationary or mobile. The terminal is preferably configured to use the Internet and/or other public or private networks. For this purpose, the terminal uses a suitable connection technology, for example Bluetooth, Lora, NFC and/or WiFi and includes at least one corresponding interface. The terminal may also be configured to be connected to the Internet and/or other networks by means of access to a cellular network.

In one embodiment, when a plurality of electronic coin data records is present or have been received, the first and/or second terminal in the method shown processes the received electronic coin data records according to their monetary value. It may thus be intended that electronic coin data records with a higher monetary value are processed before electronic coin data records with a lower monetary value. In one embodiment, the first and/or second terminal device may be configured, after receiving an electronic coin data record, to join it with the electronic coin data record already present in the second terminal device, depending on attached information, for example a currency or denomination, and to carry out a joining step accordingly. Furthermore, the second terminal may also be configured to automatically carry out a switch after receiving the electronic coin data record from the first terminal.

In one embodiment, additional information, in particular metadata, for example a currency, is transmitted from the first terminal to the second terminal during transmission. In one embodiment, this information may be included in the electronic coin data record.

In a preferred embodiment, the method comprises the further steps of: masking the transmitted electronic coin data record in the second terminal by applying the homomorphic one-way function to the transmitted electronic coin data record; and sending the masked transmitted electronic coin data record to the remote monitoring entity for checking the validity of the transmitted electronic coin data record by means of the remote monitoring entity. In this case, for example, the entire monetary amount was transferred to the second terminal as part of the electronic coin data record. Before a payee accepts this electronic coin data record, the payee checks the validity thereof if applicable. For this purpose, the second terminal generates the masked transmitted electronic coin data record, sends it to the monitoring entity and, in doing so, queries the validity of the electronic coin data record from the monitoring entity. The monitoring entity now checks whether the masked transmitted electronic coin data record is even present and whether it is still valid, i.e. has not already been used by another terminal, in order to avoid double spending.

In one embodiment, proof is created in the second terminal. The proof includes information about the correspondence between the monetary amount of the transmitted electronic coin data record and the monetary amount of the electronic coin data record to be switched. The proof preferably only includes information about the correspondence, but not of the monetary amounts.

Preferably, the electronic coin data records of the first and/or second terminal are verified in or by the monitoring entity during the step of registering. The check is carried out depending on the steps preceding the verification, for example whether a step of switching, joining and/or splitting has taken place. Here, the monitoring entity may check, for example, the validity of the (masked) electronic coin data records which are transmitted and/or to be split and/or first and second. This makes it possible to determine whether the electronic coin records are being processed for the first time. If the (masked) electronic coin data records are not valid (i.e., in particular if they are not present in the monitoring entity), registering cannot be carried out successfully, for example because the terminal tries to output an electronic coin data record several times.

In a further preferred embodiment, after the switching step has been carried out, the registering step comprises, for example, sending the switching command prepared by the terminal to the monitoring entity. The switch command preferably includes the masked electronic coin data record received, the masked electronic coin data record to be switched and preferably includes additional information needed for checks in the monitoring entity. The additional information is used to prove to the "commanding" terminal that there is knowledge of the monetary amount and the concealment amount of the electronic coin data record received without communicating the values, preferably by means of zero knowledge proof. The checking entity checks the traceability of the zero-knowledge proof, the validity of the masked electronic coin data record received and that the monetary amount of the electronic coin data record received is equivalent to the monetary amount of the electronic coin data record to be switched. In order to prove that only a new concealment amount has been added to the concealment amount of the electronic coin data record received, but the monetary amount has remained the same, the second terminal may preferably prove that the difference between the masked coin data record received and the masked coin data record to be switched has a special representation, namely that of a public key. This is done by generating a signature for the masked electronic coin data record to be switched with the added concealment amount. This generated signature of the masked electronic coin data record to be switched may then be checked in the monitoring entity, which is considered to be proof that the second terminal has knowledge of the added concealment amount. After successfully completing the checks that are relevant for the switch command, that is if the markings are appropriately complete, the (masked) electronic coin data record to be switched is preferably marked as valid. The (masked) electronic coin data record received automatically becomes invalid. The monitoring entity preferably communicates the result of the execution of the switch command, i.e. which of the masked electronic coin data records involved are valid after the switch command has been carried out, to the "commanding" terminal.

In a further preferred embodiment, the registering step comprises, after executing the splitting step, a splitting command prepared by the terminal, which is sent to the monitoring entity and includes the masked electronic coin data record to be split, the masked first electronic partial coin data record, the masked second electronic partial coin data record and preferably includes additional information needed for checks in the monitoring entity. The additional information serves as proof to the "commanding" terminal that there is knowledge of the monetary amount and the concealment amount of the electronic coin data record to be split up without communicating the values, preferably by means of a zero-knowledge proof. The checking entity checks the confirmability of the zero-knowledge proof, the validity of the masked electronic coin data record to be split and that the sum of the monetary amount of the first electronic coin data record and the monetary amount of the second electronic coin data record is equivalent to the monetary amount of the electronic coin data record to be split. This is preferably done by the monitoring entity comparing the sum of the masked first electronic partial coin data record and the masked second electronic partial coin data record with the masked partial coin data record to be split.

In a further preferred embodiment, the registering step comprises, after the joining step has been carried out, a joining command prepared by the terminal device, which is sent to the monitoring entity and includes the first masked electronic coin data record, the second masked electronic coin data record, and the masked partial coin data record to be joined and preferably includes additional information needed for checks in the monitoring entity. The additional information serves as proof to the "commanding" terminal that there is knowledge of the monetary amounts, and the concealment amounts of the first and second electronic coin data records without communicating the values, preferably by means of a zero-knowledge proof. The checking entity checks the confirmability of the zero-knowledge proof, the validity of the masked first electronic coin data record, the validity of the masked second electronic coin data record and that the sum of the monetary amount of the first electronic coin data record and the monetary amount of the second electronic coin data record is equivalent to the monetary amount of the electronic coin data record to be joined. This is preferably done by the monitoring entity comparing the sum of the masked first electronic coin data record and the masked second electronic coin data record with the masked partial coin data record to be joined. After the checks relevant for the join command have been successfully completed, that is the markings are appropriately complete, the (masked) electronic coin data record to be joined is preferably marked as valid. Here, the (masked) first electronic coin data record and the (masked) second electronic coin data record automatically become invalid. The monitoring entity preferably communicates the result of the execution of the join command, i.e. which of the masked electronic coin data records involved are valid after the join command has been executed, to the "commanding" terminal.

In one embodiment, the masking and checking of the transmitted electronic coin data record is carried out before the transmitted electronic coin data record is registered in the monitoring entity.

In a preferred embodiment, the monitoring entity is a remote entity. Thus, for example, it is intended to establish a communication connection to the monitoring entity for registering the electronic coin data record.

The monitoring entity is configured as a superordinate entity. The monitoring entity is therefore not necessarily arranged at the level or in the layer of the terminals (direct transaction layer). The monitoring entity is preferably provided for managing and checking masked electronic coin data records and is arranged in an issuing layer, in which an issuing entity is also arranged, and/or in a monitoring layer. It is conceivable that the monitoring entity also manages and checks transactions between terminals.

The monitoring entity is preferably a database—more preferably a decentrally controlled database, called Distributed Ledger Technology, DLT—in which the masked electronic coin data records are registered with corresponding processing of the masked electronic coin data record. In a preferred embodiment, a validity status of the (masked) electronic coin data record can be derived therefrom. The validity of the (masked) electronic coin data records is preferably noted in and by the checking entity. The registration of the processing or the processing steps may also relate to registering check results and intermediate check results relating to the validity of an electronic coin data record. If processing is final, this is indicated, for example, by appropriate markings or a derived overall marking. Final processing then decides whether an electronic coin data record is valid or invalid.

Moreover, this database is preferably a non-public database, but may also be implemented as a public database. This database makes it possible to check coin data records for their validity in a simple manner and to prevent "double-spending", i.e. multiple spending, without the payment transaction itself being registered or logged. DLT describes a technology for networked computers that come to an agreement about the sequence of certain transactions and about these transactions updating data. It corresponds to a decentralized management system or a decentralized database.

In a further embodiment, the database may also be configured as a public database.

Alternatively, the monitoring entity is a centrally managed database, for example in the form of a publicly accessible data storage or as a mixed form of central and decentralized databases.

The at least one initial electronic coin data record is preferably created exclusively by the issuer entity, wherein the split electronic coin data records, in particular electronic partial coin data records, may also be generated by a terminal. The creation and selection of a monetary amount preferably also comprises selecting a concealment amount with high entropy. The issuing entity is a computing system which is preferably remote from the first and/or second terminal. After creating the new electronic coin data record, the new electronic coin data record is masked in the issuer entity by applying the homomorphic one-way function to the new electronic coin data record in order to accordingly obtain a masked new electronic coin data record. Furthermore, additional information required for registering the creation of the masked new electronic coin data record in the remote monitoring entity is calculated in the issuer entity. This additional information is preferably proof that the (masked) new electronic coin data record originates from the issuer entity, for example by signing the masked new electronic coin data record. In one embodiment, it may be intended that the issuer entity signs a masked electronic coin data record with its signature when generating the electronic coin data record. The signature of the issuing entity is stored in the monitoring entity for this purpose.

The issuing entity may preferably deactivate an electronic coin data record that is in its possession (i.e., of which it knows the monetary amount and the concealment amount) by masking the electronic coin data record to be deactivated with the homomorphic one-way function and preparing a deactivation command for the monitoring entity. In addition to the masked electronic coin data record to be deactivated, the proof that the deactivation step was initiated by the issuer entity, for example in the form of the signed masked electronic coin data record to be deactivated, is preferably also part of the deactivation command. As additional information, the deactivation command could include range proofs for the masked electronic coin data record to be deactivated. The deactivation of the masked electronic coin data record is then registered in the remote monitoring entity. The step of deactivating is triggered with the deactivate command.

In a further preferred embodiment, the registering step comprises, after the deactivation step is executed, a deactivation command prepared for the issuer entity, which is sent to the monitoring entity and includes the masked electronic coin data record to be deactivated and, preferably, additional information required for checks in the monitoring entity. The additional information serves to prove that the deactivation command was initiated by the issuer entity, preferably by means of the signed masked electronic coin data record to be deactivated. The checking entity checks the signature, the validity of the masked electronic coin data record to be deactivated and, optionally, the range proof of the masked electronic coin data record to be deactivated. After successfully completing the checks relevant for the deactivation command, that is if the markings are appropriately complete, the (masked) electronic coin data record to be deactivated is preferably marked as invalid. The monitoring entity preferably communicates the result of executing the deactivation command, i.e. that the (masked) electronic coin data record to be deactivated is invalid after the deactivation command has been executed, to the issuer entity.

The steps of creating and deactivating are preferably carried out in secure locations, in particular not in the terminals. In a preferred embodiment, the steps of creating and deactivating are only carried out or initiated by the issuing entity. These steps are preferably carried out in a secure location, for example in a hardware and software architecture that was developed for processing sensitive data material in insecure networks. Deactivating the corresponding masked electronic coin data record has the effect that the corresponding masked electronic coin data record is no longer available for further processing, in particular transactions, since it has been marked as invalid in and by the monitoring entity. However, in one embodiment it may be stipulated that the deactivated masked electronic coin data record remains archived at the issuer entity. The fact that the deactivated masked electronic coin data record is no longer valid may be identified, for example, using a flag or some other encoding or the deactivated masked electronic coin data record may be destroyed and/or deleted. Of course, the deactivated masked electronic coin data record may also be physically removed from the terminal.

The method according to the invention enables various processing operations for the electronic coin data records and the corresponding masked electronic coin data records. Each of the processing operations (in particular creating, deactivating, splitting, joining and switching) is registered in the monitoring entity and appended there to the list of previous processing operations for the respective masked electronic coin data record in unchangeable form. The processing operations "create" and "deactivate", which concern the existence of the monetary amount per se, that is the creation and deletion or even destruction of money, require additional approval, for example in the form of a signature, by the issuing entity in order to be registered (i.e. logged) in the monitoring entity. The other processing operations (splitting, joining, switching) do not require any authorization by the issuing entity or by the command initiator (=payer, e.g. the first terminal).

The steps of switching, splitting or joining (registering modifications) and creating and deactivating (initial registration and final deregistration) listed here are each triggered in the monitoring entity by corresponding requests (or commands), for example a corresponding create, switch, split, join or deactivate command.

Processing in the direct transaction layer only affects the ownership structure and/or the association of the coin data records with the terminals of the respective electronic coin data records. Registering the respective processing in the monitoring entity is implemented, for example, by means of corresponding list entries in a database which comprises a number of markings that must be carried out by the monitoring entity. One possible structure for a list entry includes, for example, column(s) for a predecessor coin data record, column(s) for a successor coin data record, a signature column for the issuer entity, and at least one marking column. A change in the status of the marking requires the approval of the monitoring entity and must then be saved unchangeably. A change is final if and only if the required markings have been validated by the monitoring entity, i.e. for example, if the status "0" has been changed to the status "1" after the corresponding check. If a check fails or takes too long, a change is made instead, for example, from the status "-" to the status "0". Further status values are conceivable and/or the status values mentioned here are interchangeable. Preferably, the validity of the respective (masked) electronic coin data records is represented in a manner summarized from the status values of the markings in a column for each masked electronic coin data record involved in registering the processing.

In a further exemplary embodiment, at least two, preferably three, or even all of the aforementioned markings may also be replaced by a single marking which is set when all checks have been successfully completed. Furthermore, the two columns for predecessor data records and successor data records may each be combined into one in which all coin data records are listed together. In this way, more than two electronic coin data records could be managed per field entry, and thus, for example, a split into more than two coins could be implemented.

The checks by the checking entity for checking whether processing is final are already described above and are in particular:

Are the masked electronic coin data records of the predecessor column(s) valid?

Does a check obtain the correct check value?

Are the range proofs for the masked electronic coin data records successful?

Is the signature of the masked electronic coin data record a valid signature of the issuing entity?

It is also preferred that a masked electronic coin data record is invalid when one of the following checks is triggered, that is when:

(1) the masked electronic coin data record is not registered in the monitoring entity;
(2) the last processing of the masked electronic coin data record indicates that there are predecessor coin data records for it, but this last processing is not final; or
(3) the last processing of the masked electronic coin data record indicates that there are successor coin data records for it and this last processing is final.
(4) the masked electronic coin record is not the successor to a valid masked electronic record unless it is signed by the issuer entity.

In one aspect of the invention, a payment system for exchanging monetary amounts is provided with a monitoring layer including a—preferably decentrally controlled, Distributed Ledger Technology, DLT—database in which masked electronic coin data records are stored; and a direct transaction layer including at least two terminals in which the method described above can be executed; and/or an issuer entity for generating an electronic coin data record. Here, the issuer entity may prove that the masked generated electronic coin data record was generated by it and the issuer entity may preferably identify itself by signing and the monitoring entity may check the signature of the issuer entity.

In a preferred embodiment, the payment system comprises an issuer entity for generating an electronic coin data record. Here, the issuer entity may prove that the masked generated electronic coin data record was generated by it and the issuer entity may preferably identify itself by signing and the monitoring entity may check the signature of the issuer entity.

The payment system is preferably configured to carry out the above-mentioned method and/or at least one of the embodiment variants.

Another aspect of the invention relates to a currency system comprising an issuer entity, a monitoring entity, a first terminal, and a second terminal, the issuer entity being configured to create an electronic coin data record. The masked electronic coin data is formed such that it has been verifiably created by the issuing entity. The monitoring entity is configured to carry out a registering step as carried out in the above-mentioned method. Preferably, the terminals, i.e. at least the first and second terminals, are suitable for carrying out one of the above-mentioned methods for transmitting.

In a preferred embodiment of the currency system, only the issuer entity is authorized to initially create an electronic coin data record. Processing, for example the step of joining, splitting and/or switching, can be and is preferably carried out by a terminal. Preferably, the processing step of deactivating may only be carried out by the issuing entity. Thus, only the issuer entity would be authorized to invalidate the electronic coin data record and/or the masked electronic coin data record.

The checking entity and the issuing entity are preferably arranged in a server entity or are available as a computer program product on a server and/or a computer.

An electronic coin data record may be provided in a large number of different forms and may thus be exchanged via various communication channels, also referred to below as interfaces. This creates a very flexible exchange of electronic coin data records.

The electronic coin data record is represented, for example, as an optoelectronically detectable code, for example a barcode or QR code, and thus a one-dimensionally or two-dimensionally encoded data record. It may be displayed in this visual form, for example by means of an electronic display unit (display, monitor) or as a printout on paper. It may therefore be represented as visual manifestation. In this visual form, the electronic coin data record may also be acquired by an electronic acquisition unit, for example a scanner (barcode scanner, QR code scanner) or a camera. In particular, the monetary value and the blind signature are mapped as an optoelectronically detectable code.

The electronic coin data record can be represented in the form of a file, for example. A file consists of related data stored on a data carrier, data storage medium or storage medium. Each file is first of all a one-dimensional sequence of bits, which are normally interpreted in byte blocks. An application program (application) or an operating system itself interprets this bit or byte sequence, for example, as a text, an image or a sound recording. The file format used here may be different, for example it may be a pure text file representing the electronic coin data record. In particular, the monetary value and the blind signature are mapped as a file.

The electronic coin data record is, for example, a sequence of American Standard Code for Information Interchange, ASCII for short, characters. In particular, the monetary value and the blind signature are mapped as this sequence.

The electronic coin data record may also be converted from one form of representation to another form of representation in a device. For example, the electronic coin data record may be received in the device as a QR code and output by the device as a file or character string.

These different forms of representation of one and the same electronic coin data record allow for a very flexible exchange between devices with different technical equipment using different transmission media (air, paper, wired) while taking into account the technical configuration of a device. The form of representation of the electronic coin data records is preferably selected automatically, for example on the basis of recognized or negotiated transmission media and device components. In addition, a user of a device may also select the form of representation for exchanging (=transmitting) an electronic coin data record.

In one aspect of the invention, the object is achieved by a device configured to directly transmit electronic coin data records to another device. The device comprises means for accessing a data storage, wherein at least one electronic coin data record is stored in the data storage; an interface at least for outputting the at least one electronic coin data record to the other device; and a computing unit configured to mask the electronic coin data record in the device by applying a homomorphic encryption function to the electronic coin data record to obtain a masked electronic coin data record for registering the masked electronic coin data record in a monitoring entity; and to output the electronic coin data record by means of the interface, wherein the at least one electronic coin data record is structured as described above, i.e. includes a monetary amount and a blind signature.

Here, a device is a previously described terminal or a previously described machine.

In a simple case, the data storage is an internal data storage of the device. The electronic coin data records are stored here. This guarantees easy access to electronic coin data records.

The data storage is in particular an external data storage, also called online storage. Thus, the device only has one means of access to the externally and thus securely stored coin data records. In particular, if the device is lost or if the device malfunctions, the electronic coin data records are not lost. Since the possession of the (unmasked) electronic coin data records correspond to the possession of the monetary amount, money can be stored more securely by using external data storage devices.

When the monitoring entity is a remote monitoring entity, the device preferably includes an interface for communication by means of a customary Internet communication protocol, for example TCP, IP, UDP or HTTP. The transmission may comprise communication via the cellular network.

In a preferred embodiment, the device is configured to carry out the processing already described on an electronic coin data record. For this purpose, the computing unit is configured to mask an electronic coin data record to be switched as the electronic coin data record which the monitoring entity needs as a masked electronic coin data record for registering the switch command or in the switching step. In this way, an electronic coin data record may be switched, as described above.

Additionally or alternatively, the computing unit is preferably configured to mask an electronic coin data record split into a first electronic partial part data record and a second electronic partial coin data record in order to obtain a masked first electronic partial coin data record and a masked second electronic partial coin data record that is to be registered in the monitoring entity. In this way, an electronic coin data record may be split, as described above.

Additionally or alternatively, the computing unit is preferably configured to mask an electronic partial coin data record to be joined from a first and a second electronic coin data record as the electronic coin data record in order to obtain a masked coin data record to be joined as the masked electronic coin data record registered in the monitoring entity. In this way, an electronic coin data record may be joined, as described above.

In a preferred embodiment, the interface for outputting the at least one electronic coin data record is an electronic display unit of the device which is configured to display the electronic coin data record and thereby (also) output the electronic coin data record in visual form. As has already been described, the electronic coin data record may then be exchanged between devices, for example in the form of an optoelectronically detectable code, an image, etc.

In a preferred embodiment, the interface for outputting the at least one electronic coin data record is a protocol interface for wirelessly sending the electronic coin data record to the other device by means of a communication protocol for wireless communication. In particular, near-field communication, for example using the Bluetooth protocol or NFC protocol or IR protocol, is provided; alternatively or additionally, WLAN connections or mobile radio connections are conceivable. The electronic coin data record is then adapted and transmitted in accordance with the protocol properties.

In a preferred embodiment, the interface for outputting the at least one electronic coin data record is a data interface for providing the electronic coin data record to the other device by means of an application. In contrast to the protocol interface, the electronic coin data record is transmitted by means of an application here. This application then transmits the coin data record in a corresponding file format. A file format specific to electronic coin data records may be used. In the simplest form, the coin data record is transmitted as an ASCII character string or as a text message, e.g. SMS, MMS, instant messenger message (such as Threema or WhatsApp). A wallet application may also be provided. Here, the exchanging devices preferably ensure that an exchange by means of the application is possible, that is that both devices have the application and are ready for exchange.

In a preferred embodiment, the device also includes an interface for receiving electronic coin data records.

In a preferred embodiment, the interface for receiving the at least one electronic coin data record is an electronic acquisition module of the device which is configured to acquire an electronic coin data record represented in visual form. The acquisition module is then, for example, a camera or a barcode or QR code scanner.

In a preferred embodiment, the interface for receiving the at least one electronic coin data record is a protocol interface for wirelessly receiving the electronic coin data record from another device by means of a communication protocol for wireless communication. In particular, near-field communication is provided, for example using the Bluetooth protocol or NFC protocol or IR protocol. Alternatively or additionally, WLAN connections or cellular connections are conceivable.

In a preferred embodiment, the interface for receiving the at least one electronic coin data record is a data interface for receiving the electronic coin data record from the other device by means of an application. This application then receives the coin data record in a corresponding file format. A file format specific to coin data records may be used. In the simplest form, the coin data record is transmitted as an ASCII string or as a text message, for example SMS, MMS, Threema or WhatsApp. In addition, the transmission may be carried out using a wallet application.

In a preferred embodiment, the interface for receiving the at least one electronic coin data record is also the interface for outputting the electronic coin data record so that an interface for both sending and receiving the coin data record is provided.

In a preferred embodiment, the device also includes a means for accessing an electronic safe module, the safe module being configured to securely store at least one electronic coin data record, preferably in an online storage. The device is preferably a terminal such as a smartphone, laptop, smartwatch, smartcard, etc. The safe module, also referred to as a "vault", may be a data storage device for electronic coin data records that the user can access only after additional (successful) authentication, for example via biometric features, PIN, password. This safe module may be set up on the device and is then protected by additional security functions. For example, the safe module is a secure runtime environment, TEE, or a security element such as eUICC etc. Alternatively, the safe module is set up outside the device, for example as a trusted server of a trusted third party that offers a safe module function.

Here, the safe module may also initiate processing on the data record, in particular splitting, joining and switching, and for these purposes may be connected to the monitoring entity for communication purposes. In this form, the safe module is then a computing unit of the device and is configured to mask and output the electronic coin data record. This processing is also preferably only carried out after successful authentication.

(Unmasked) Coin data records may be loaded into this safe module automatically. For example, the user may define a specification such as a threshold value in the device. The threshold value represents, for example, a maximum monetary amount or a maximum number of electronic coin data records. The computing unit automatically detects when this defined threshold value has been exceeded in the device—for example after an incoming payment from another device.

Then (unmasked) electronic coin data records are automatically loaded into the safe module and only coin data records meeting the defined threshold value remain on the device or in a less secured or unsecured data storage.

The safe module may also be a stand-alone device. In addition to the secured memory, this safe module then includes a communication means for input and a communication means for output and a means for querying an authentication of the user. The safe module may be personalized initially. Alternatively, the safe module may be connected to the device in order to use interfaces thereof to exchange coin data records.

In a preferred embodiment, the device includes a module configured to recognize a predefined location zone. A location zone is understood to be home zone or a home area, for example. This location zone may be the coverage area of a WLAN area, for example defined by the name (SSID) of the WLAN. The module is then, for example, a WLAN module. The device detects active WLANs and may then be connected to the predefined WLAN in order to be connected to the Internet. The device does not carry out some special functions until it has recognized that it is in the predefined location zone. A specific WLAN network may optionally be defined. Additionally or alternatively, the module may be a global positioning system, GPS, module which is used to recognize that the device is within predefined GPS coordinates. The device only performs special functions in the predefined location zone. The location zone is defined either directly on the device or on the module.

The particular (special) functions that are carried out when the location zone is recognized are, for example, the automatic transmission (i.e., both sending and receiving) of electronic coin data records, for example to the safe module and/or the external data storage and/or the transmission of masked coin data records for switching the respective coin data record in the monitoring entity. The location recognition module and the safe module may preferably interact so that the safe module is filled with coin data records or they are removed from it (only) based on the defined threshold value and when the location zone is recognized. This allows for automatic loading and transmitting as well as debiting depending on the location and a defined threshold value.

The device may particularly preferably be configured, depending on a specification for electronic coin data records stored in the terminal, in particular a threshold value of a monetary amount for electronic coin data records stored in the terminal, a maximum number of electronic coin data records and/or a denomination specification for the electronic coin data records stored in the terminal electronic coin data records, to automatically transmit at least one electronic coin data record from the device or into the device in order to comply with the specification. In order to comply with the specification, for example, the electronic coin data record is transmitted from the device to the safe module or from the safe module to the device. Alternatively or additionally, the device may optionally be configured to transmit the electronic coin data record from an issuer entity to the device or from the device to the issuer entity in order to comply with the specification.

In order to increase security, it may be envisioned that the issuing entity only issues electronic coin data records to safe modules of devices and/or only withdraws electronic coin data records from safe modules of devices. The device(s) is (are) configured to exchange electronic coin data records with other devices via the interface and preferably to exchange, in particular request or return, electronic coin data records with the issuer entity only by means of the safe module.

In a preferred embodiment, the computing unit is configured to detect a difference between a monetary amount to be transmitted and a monetary amount of the electronic coin data record; request an electronic coin data record having a monetary amount equal to the detected difference at an issuer entity; receive the requested electronic coin data record. Preferably, the received electronic coin data record is joined to the stored electronic coin data record and the electronic coin data record to be joined is masked for registration with the monitoring entity. The joined electronic coin data record is then transmitted. In an alternative embodiment, the received electronic coin data record is switched at the monitoring entity. The switched and the existing electronic coin data record are then transmitted. The device may thus provide the desired payment amount fully automatically in an electronic coin data record and instruct the issuer entity for this purpose. This is optionally also one of the special functions of the device, which may only be carried out in a location zone and when falling below a predefined threshold value.

In a preferred embodiment, the computing unit is configured to detect a surplus of the received monetary amount and a threshold value of a monetary amount for stored electronic coin data records; and transfer the surplus, for example via crediting the surplus to a bank account or transmitting to a safe module, by splitting the electronic coin data record to obtain a first electronic partial coin data record corresponding to the threshold value and a second electronic partial coin data record corresponding to the surplus, and masking the first and second partial coin data records for obtaining masked first and second electronic coin data records for splitting at the monitoring entity. Thus, the device may automatically have a surplus amount credited to a bank account, for example, and thus keep the number and values of the coin data record on the device low (in terms of the threshold value). This is also one of the special functions of the device which may only be carried out in a location zone and when a predefined threshold value is exceeded.

In a preferred embodiment, the device, in particular the first and/or second terminal, includes a bank note module which is set up for the input and/or output of bank notes. In this case, the device is preferably a machine or an automat, for example a self-service terminal or a component in a register system of a retailer or a bank entity.

In a preferred embodiment, the device is a register terminal and/or an automat and is configured to output a monetary amount in part as bank notes using the bank note module and in part as an electronic coin data record using the interface. In this case, the device allows for analog coins to be dispensed with entirely. A part of the monetary amount to be transmitted is given as bank notes, rounded down to the nearest denomination, and the remainder is given out as an electronic coin record. This replaces giving out money in the form of analog coins.

The electronic coin data record (as part of the payment) may be transmitted in (opto-) electronic form or may be a printout from the register component that the user receives.

The part of the monetary amount to be output as an electronic coin data record is preferably a first electronic coin data record of a split electronic coin data record.

In a preferred embodiment, the device is a register terminal and/or an automat and is configured to output a monetary amount in bank notes by means of the bank note module, wherein the device receives a partial monetary amount in the form of an electronic coin data record from another device. For this purpose, the device may notify the other device what monetary value it expects, that is, it may request an electronic coin data record of a certain monetary value. In this case, it is also possible to omit transmitting analog coins. A part of the monetary amount to be transmitted takes the form of bank notes, rounded up to the nearest denomination, and the remainder is received from the terminal as an electronic coin data record—as negative change, so to speak.

The electronic coin data record (as part of the payment) may be transmitted in (opto-) electronic form or may be a printout that the register component receives.

Preferably, the part of the monetary amount to be received as an electronic coin data record is a first electronic partial coin data record of an electronic coin data record split (by the user). Here, the other device (that is, the user's device) may either contact the monitoring entity automatically for splitting or may use the device as a trusted entity for communication with the monitoring entity. In a preferred embodiment, the other device would, in this case, send the device an electronic coin data record with the request to split it into, for example, a first predefined electronic partial coin data record and a second predefined electronic partial coin data record.

In a preferred embodiment, the device comprises at least one security element reading device configured to read a security element; a random number generator; and/or a communication interface to a safe module and/or bank with authorized access to a bank account.

In a preferred embodiment, the data storage is a shared data storage that can be accessed by at least one other device, each of the terminals including an application, said application being configured to communicate with the monitoring entity for the corresponding registration of electronic partial coin data records.

In one aspect of the invention, a payment system for exchanging monetary amounts is provided comprising a monitoring layer including a database, preferably a decentrally controlled database (DLT), in which masked electronic coin data records are stored; and a direct transaction layer including at least one device according to one of the preceding types and another device, preferably according to one of the preceding types; and/or an issuer entity for generating an electronic coin data record and a signature, the signature being stored in the decentrally controlled database.

What is proposed here is a solution that issues digital money in the form of electronic coin data records, which is similar to the use of conventional (analog) bank notes and/or coins. The digital money is represented by electronic coin data records. As with (analog) bank notes, these electronic coin data records can also be used for all forms of payments, including peer-to-peer payments and/or POS payments. The knowledge of all components (in particular the monetary amount and the concealment amount) of a valid electronic coin data record is equivalent to the possession (ownership) of the digital money. It is therefore advisable to treat these valid electronic coin data records confidentially, for example to store them in a security element/safe module of a terminal and to process them therein. In order to decide on the authenticity of an electronic coin data record and to prevent double spending, masked electronic coin data records are maintained in the monitoring entity as a corresponding unique public representation of the electronic coin data record. The knowledge or the possession of a masked electronic coin data record does not represent the possession of money. Rather, this is equivalent to checking the authenticity of the analog means of payment.

The monitoring entity also contains markings regarding executed and planned processing of the masked electronic coin data record. A status of the respective masked electronic coin data record is derived from the markings relating to the processing, said status indicating whether the corresponding (unmasked) electronic coin data record is valid, i.e. ready for payment. A recipient of an electronic coin data record will therefore first generate a masked electronic coin data record and will have the validity of the masked electronic coin data record authenticated by the monitoring entity. A great advantage of this solution according to the invention is that the digital money is distributed to terminals, retailers, banks and other users of the system, but no digital money or other metadata is stored in the monitoring entity—that is, a shared entity.

The proposed solution may be integrated into existing payment systems and infrastructures. In particular, there may be a combination of analog payment processes with bank notes and coins and digital payment processes in accordance with the present solution. A payment process may take place with bank notes and/or coins, but the change or drawback is available as an electronic coin data record. For example, ATMs with a corresponding configuration, in particular with a suitable communication interface, and/or mobile terminals may be provided for the transaction. An exchange of electronic coin data records for bank notes or coins is also conceivable.

The steps of creating, switching, splitting, joining and deactivating listed here are each triggered by a corresponding create, switch, split, join or deactivate command.

BRIEF DESCRIPTION OF THE FIGURES

The invention and further embodiments and advantages of the invention are explained in more detail below with reference to figures, said figures merely describing exemplary embodiments of the invention. The same components in the figures are provided with the same reference symbols. The figures are not to be regarded as true to scale; individual elements of the figures may be shown exaggeratedly large or exaggeratedly simplified.

In the figures:

FIG. 2 shows an embodiment of a monitoring entity;

DESCRIPTION OF FIGURES

Figure 1:
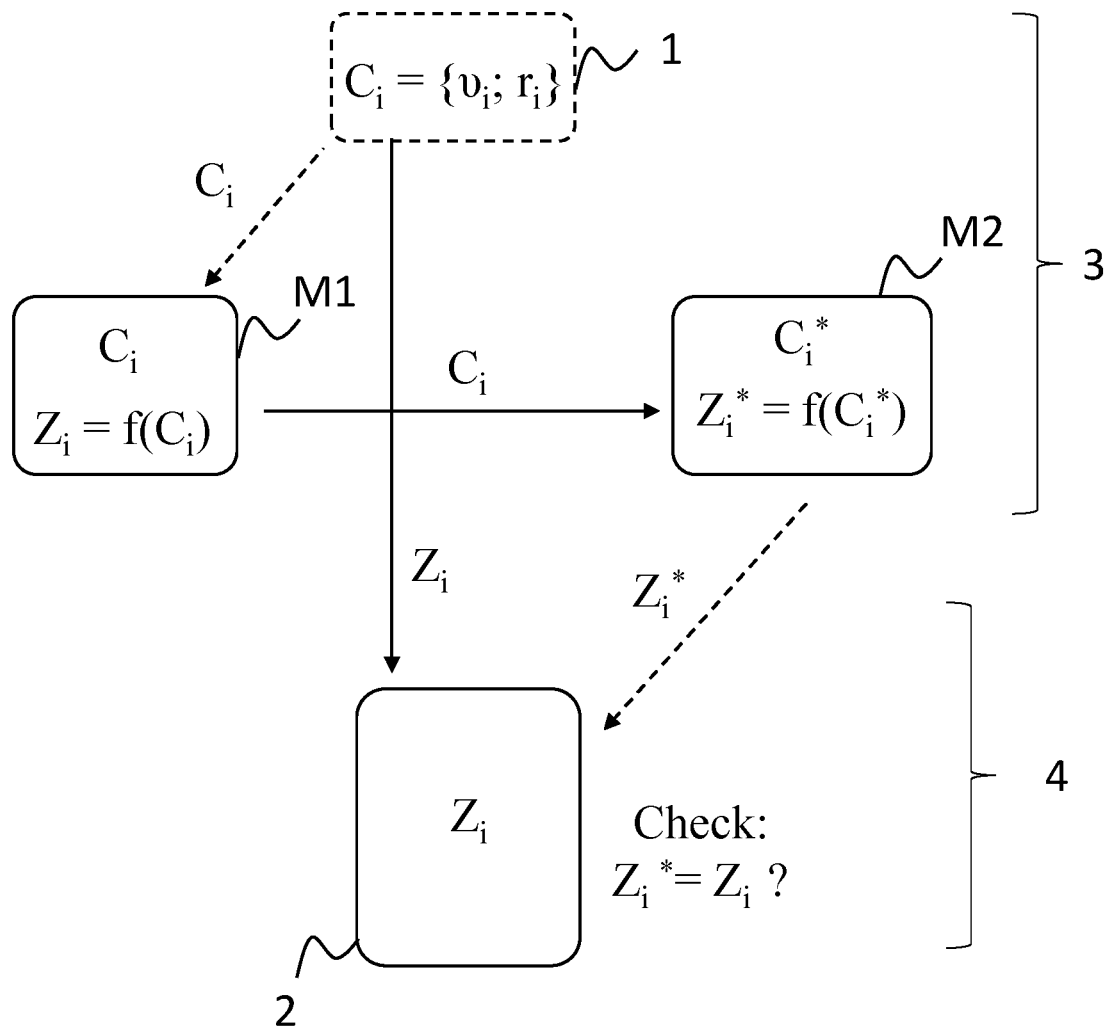
FIG. 1 shows an embodiment of a payment system according to the invention.

FIG. 1 shows an embodiment of a payment system including terminals M1 and M2 according to the invention. The terminals M1 and M2 may also be devices.

Here, an electronic coin data record $C_i$ is generated in an issuer entity 1, for example a central bank. For the electronic coin data record $C_i$, which includes a concealment amount, a masked electronic coin data record $Z_i$ is generated and registered in a database, which may be configured as a "concealed electronic data record ledger" here. In the context of this invention, a ledger is understood to be a list, a directory, preferably a database structure. The electronic coin data record $C_i$ is output to a first terminal M1.

For example, a true random number was generated for this purpose as the concealment amount $r_i$. This concealment amount $r_i$ is linked to a monetary amount $\upsilon_i$ and then forms an i-th electronic coin data record according to the invention:

$$C_i = \{\upsilon_i; r_i\} \tag{1}$$

A valid electronic coin data record can be used for payment. The owner of the two values $\upsilon_i$ and $r_i$ is therefore in possession of the digital money. However, the digital money is defined in the system by a pair consisting of a valid electronic coin data record and a corresponding masked electronic coin data record $Z_i$. The masked electronic coin data record $Z_i$ is obtained by applying a homomorphic one-way function $f(C_i)$ according to equation (2):

$$Z_i = f(C_i) \tag{2}$$

This function $f(C_i)$ is public, i.e. every system participant may call and use this function. This function $f(C_i)$ is defined according to equation (3):

$$Z_i = \upsilon_i \cdot H + r_i \cdot G \tag{3}$$

where H and G are generator points of a group G, in which the discrete logarithm problem is hard, with the generators G and H, for which the discrete logarithm of the respective other base is unknown. For example, G and H are generator points of elliptical curve cryptography, ECC—that is, private keys of the ECC. These generator points G and H must be chosen in such a way that the relationship between G and H is not publicly known, so that with:

$$G = n \cdot H \tag{4}$$

the link n must be practically impossible to find in order to prevent the monetary amount $v_i$ from being manipulated while a valid $Z_i$ can still be calculated. Equation (3) is a "Pederson commitment for ECC" ensuring that the monetary amount $v_i$ can be passed, i.e. "committed", to a monitoring entity 2 without revealing it to the monitoring entity 2. Therefore, only the masked coin data record $Z_i$ is sent (revealed) to the public and remote monitoring entity 2 is Even if encryption based on elliptical curves is or is described in the present example, another cryptographic method based on a discrete logarithmic method would also be conceivable.

Due to the entropy of the concealment amount $r_i$, Equation (3) allows for a cryptographically strong $Z_i$ to be obtained even with a small range of values for monetary amounts $v_i$. This means that a simple brute force attack by simply estimating monetary amounts is practically impossible.

Equation (3) is a one-way function, which means that the computation of $Z_i$ from $C_i$ is easy because an efficient algorithm exists, whereas the computation of $C_i$ from $Z_i$ is very difficult because there is no algorithm that can be solved in polynomial time.

In addition, equation (3) is homomorphic for addition and subtraction, i.e. the following applies:

$$Z_i + Z_j = (v_i \cdot H + r_i \cdot G) + (v_j \cdot H + r_j \cdot G) = (v_i + v_j) \cdot H + (r_i + r_j) \cdot G \quad (5)$$

Thus, addition operations and subtraction operations can be carried out both in the direct transaction layer 3 and also in parallel in the monitoring layer 4 without the monitoring layer 4 having knowledge of the electronic coin data records $C_i$. The homomorphic property of equation (3) makes it possible to manage valid and invalid electronic coin data records $C_i$ on the sole basis of the masked coin data records $Z_i$ and to ensure that no new monetary amount $v_j$ has been created.

Due to this homomorphic property, the coin data record $C_i$ can be split according to equation (1) into:

$$C_i = C_j + C_k = \{v_j; r_j\} + \{v_k; r_k\} \quad (6)$$

where:

$$v_i = v_j + v_k \quad (7)$$

$$r_i = r_j + r_k \quad (8)$$

The following applies to the corresponding masked coin data records:

$$Z_i = Z_j + Z_k \quad (9)$$

Figure 3:
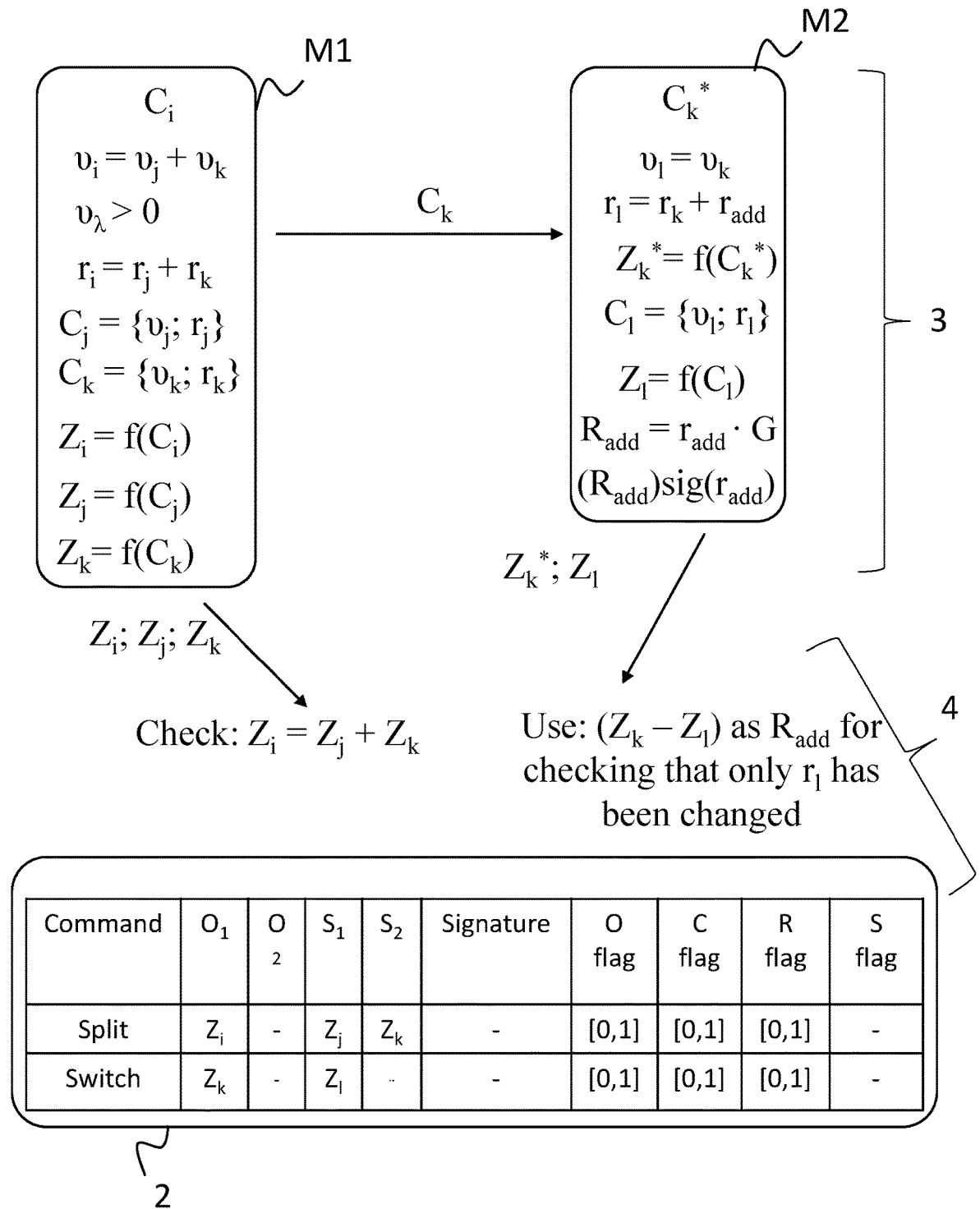
FIG. 3 shows an embodiment of a payment system according to the invention for splitting and switching electronic coin data records.

With equation (9), for example, a "split" processing or a "split" processing step of a coin data record according to FIG. 3 may be checked in a simple manner without the monitoring entity 2 having knowledge of $C_i$, $C_j$, $C_k$. Specifically, the condition of equation (9) is checked to validate split coin records $C_j$ and $C_k$ and invalidate coin record $C_i$. Such a split of an electronic coin data record $C_i$ is shown in FIG. 3.

Figure 4:
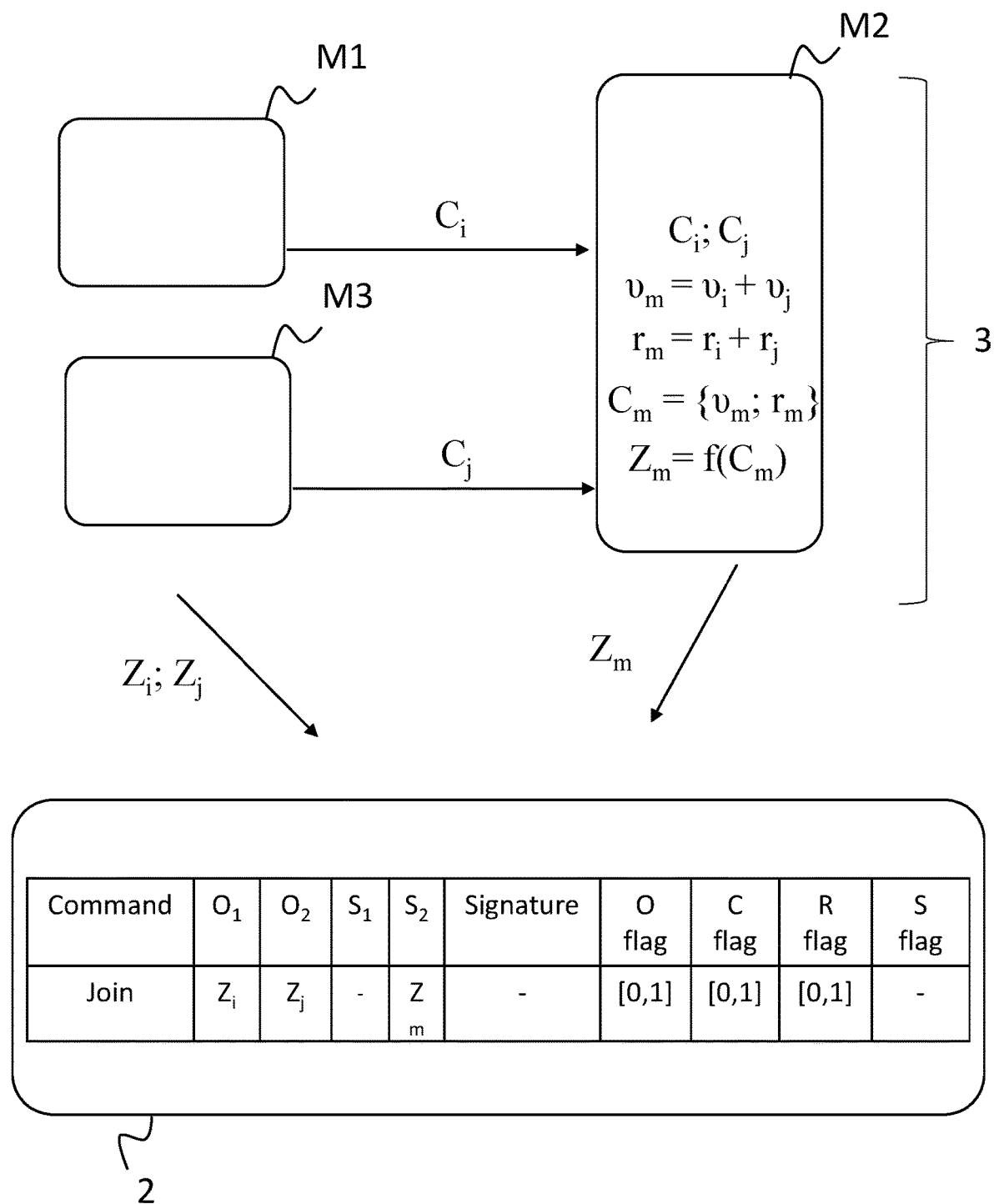
FIG. 4 shows an embodiment of a payment system according to the invention for joining electronic coin data records.

In the same way, electronic coin data records can also be put together (joined), see FIG. 4 and the explanations therefor.

In addition, it is necessary to check whether (not allowed) negative monetary amounts are registered. An owner of an electronic coin data record $C_i$ must be able to prove to the monitoring entity 2 that all monetary amounts $v_i$ in a processing operation are within a value range of $[0, \ldots, n]$ without informing the monitoring entity 2 about the monetary amounts $v_i$. These proofs of range are also called "range proofs". Ring signatures are preferably used as range proofs. For the present exemplary embodiment, both the monetary value and the concealment amount of an electronic coin data record are resolved in bit representation, i.e. $v_i = \Sigma a_j * 2^j$ for $0 \le j \le n$ and $a_j$ "element" $\{0; 1\}$ and $r_i = \Sigma b_j * 2^j$ for $0 \le j \le n$ and $b_j$ "element" $\{0; 1\}$. A ring signature with $C_{ij} = a_j \cdot H + b_j \cdot G$ and $C_{ij} = a_j \cdot H$ is preferably carried out for each bit, wherein, in one embodiment, it is possible to carry out a ring signature only for certain bits.

What is not shown in FIG. 1 and will only be explained later is that new electronic coin data records $C_i$ are preferably not output directly to terminals, but rather initially to a server entity of a commercial bank, for example.

In FIG. 1, an electronic coin data record $C_i$ is generated by the issuer entity 1 and a masked electronic coin data record $Z_i$ is calculated by the issuer entity 1 using equation (3) and registered in the monitoring entity 2. The first terminal M1, which can transmit the electronic coin data record $C_i$ to a second terminal M2 or can carry out one of the processing steps (switching, joining, splitting), then transmits. The transmission takes place wirelessly via WLAN, NFC or Bluetooth, for example. The transmission may be additionally secured by cryptographic encryption methods, for example by negotiating a session key or using a PKI infrastructure.

The transmitted electronic coin data record $C_i$ is received as $C_i^*$ in the second terminal M2. When the electronic coin data record $C_i^*$ is received, the second terminal M2 is in possession of the digital money represented by the electronic coin data record $C_i^*$. If both terminals trust each other, no further steps are necessary to end the process. However, the terminal M2 does not know whether the electronic coin data record $C_i^*$ is actually valid. In addition, the terminal M1 could also transmit the electronic coin data record $C_i$ to a third terminal (not shown). In order to prevent this, further preferred steps are provided in the method.

In order to check the validity of the received electronic coin data record $C_i^*$, the masked transmitted electronic coin data record $Z_i^*$ is calculated in the second terminal M2 with the—public—one-way function from equation (3). The masked transmitted electronic coin data record $Z_i^*$ is then transmitted to the monitoring entity 2 and searched there. If there is a match with a registered and valid masked electronic coin data record, the validity of the received coin data record $C_i^*$ is indicated to the second terminal M2 and it is determined that the received electronic coin data record $C_i^*$ is equal to the registered electronic coin data record $C_i$. With the check for validity, it may be determined, in one embodiment, that the received electronic coin data record $C_i^*$ is still valid, i.e. that it has not already been used by another processing step or in another transaction and/or was subject to another change.

Preferably, the electronic coin data record obtained is then switched.

It is essential to the method according to the invention that the sole knowledge of a masked electronic coin data record $Z_i$ does not entitle the holder to spend the digital money. The sole knowledge of the electronic coin data record $C_i$, however, authorizes payment, i.e. to successfully carry out a transaction, in particular if the coin data record $C_i$ is valid. There is a 1-to-1 relationship between the electronic coin data records $C_i$ and the corresponding masked electronic coin data records $Z_i$. The masked electronic coin data records $Z_i$ are registered in the monitoring entity 2, for example a public decentralized database. This registration makes it possible to check the validity of the data record, for example whether new monetary amounts have been created (illegally).

A main distinguishing feature compared to conventional solutions is that the masked electronic coin data records $Z_i$ are stored in a monitoring layer 4 and all processing operations on the electronic coin data record $Z_i$ are registered there, whereas the actual transmission of the digital money takes place in a (secret, i.e. one not known to the public) direct transaction layer 3.

In order to prevent multiple spending or to ensure more flexible transmission, the electronic coin data records can now be processed in the method according to the invention. The following table 1 lists the individual operations, with the specified command also executing a corresponding processing step:

TABLE 1

Number of operations to be carried out per processing of a coin data record in the terminal or issuer entity; further operations not listed here are required; instead of the implementation listed, other implementations implying other operations are conceivable

| Command or step | Create signature | Create random number | Create mask | Create range proof |
|---|---|---|---|---|
| Create | 1 | 1 | 1 | 0 or 1 |
| Deactivate | 1 | 0 | 1 | 0 or 1 |

TABLE 1-continued

Number of operations to be carried out per processing of a coin data record in the terminal or issuer entity; further operations not listed here are required; instead of the implementation listed, other implementations implying other operations are conceivable

| Command or step | Create signature | Create random number | Create mask | Create range proof |
|---|---|---|---|---|
| Split | 0 | 1 | 3 | 0 or 1 |
| Join | 0 | 0 | 3 | 1 |
| Switch | 0 | 1 | 2 | 1 |

Table 1 above shows that, for each coin data record and each of the processing operations "create", "deactivate", "split", "join" and "switch", different operations "create signature"; "create random number"; "create Mask"; "range proof" may be provided, each of the processing operations being registered in the monitoring entity 2 and appended there in unchangeable form to a list of previous processing operations for masked electronic coin data records $Z_i$. The processing operations of "create" and "deactivate" on an electronic coin data record are only carried out in secure locations and/or only by selected entities, for example the issuer entity 1, while the operations of all other processing operations can be carried out on terminals M1 to M3.

The number of operations for the individual processing is marked in table 1 with "0", "1" or "2". The number "0" indicates that the terminal or issuer entity 1 does not have to carry out this operation for this processing of the electronic coin data record. The number "1" indicates that the terminal or issuer entity 1 must be able to carry out this operation once for this processing of the electronic coin data record. The number "2" indicates that the terminal or issuer entity 1 must be able to carry out this operation twice for this processing of the electronic coin data record.

In principle, it may also be planned, in one embodiment, that a range proof is also carried out by the issuer entity 1 during creation and/or deletion.

The operations required for the monitoring entity 2 for the individual processing operations are listed in the Table 2 below:

TABLE 2

Number of operations to be carried out per processing of a coin data record in the monitoring entity; further operations not listed here are required; instead of the implementation listed, other implementations implying other operations are conceivable

| Command or step | Checking the signature of the issuer | Checking the validity of the masked electronic data record | Checking range proof | Checking homomorphic properties of the masked electronic coin data records, i.e. adding or subtracting |
|---|---|---|---|---|
| Create | 1 | 0 | 0 or 1 | 0 |
| Deactivate | 1 | 1 | 0 or 1 | 0 |
| Split | 0 | 1 | 2 or more | 1 |
| Join | 0 | 2 or more | 1 | 1 |
| Switch | 0 | 1 | 1 | 0 |

All operations of Table 2 can be carried out in the monitoring entity 2, which, as a trusted entity, for example as a decentralized server, in particular a distributed trusted server, ensures sufficient integrity of the electronic coin data records.

Table 3 shows the components to be preferably installed for the system participants in the payment system of FIG. 1:

TABLE 3

| Preferred units in the system components | | | |
| --- | --- | --- | --- |
| Command or step | Issuer entity | Terminal | Monitoring entity |
| Random number generator (high security) | Yes | — | — |
| Random number generator (deterministic) | — | Yes | — |
| PKI for signing | Yes | — | — |
| PKI for checking signature | — | (Yes) | Yes |
| Read access on DLT | Yes | Yes | Yes |
| Write access on DLT | Yes | Yes | Yes |
| Deactivating the electronic coin data record | Yes | Yes | |
| Transport encryption | Yes | Yes | — |
| Safe storage | (Yes) | Yes | —/Yes |
| Masking unit | Yes | Yes | — |
| Range proof | — | Yes | — |
| Checking range proof | — | — | Yes |
| DLT software | — | — | Yes |

Table 3 shows an overview of the components to be preferably used in each system participant, i.e. the issuer entity 1, a terminal M1 and the monitoring entity 2. The terminal M1 may be configured as a wallet for electronic coin data records, i.e. as an electronic purse, i.e. a data storage for the terminal in which a large number of coin data records can be stored, and may be implemented, for example, in the form of an application on a smartphone or IT system of a retailer, a commercial bank or another market participant, and send or receive an electronic coin data record. Thus, the components in the terminal as shown in Table 3 are implemented as software. It is assumed that the monitoring entity 2 is based on a DLT and is operated by a number of trusted market participants.

FIG. 2 shows an exemplary embodiment of a monitoring entity 2 from FIG. 1. In FIG. 2, an exemplary database is shown in the form of a table in which the masked electronic coin data records $Z_i$ and possibly—as shown here—processing thereof are registered. In the simplest embodiment of the database, on the other hand, only the currently valid masked coin data records $Z_i$ would be stored. The monitoring entity 2 is preferably arranged remote from the terminals M1 to M3 locally and is accommodated, for example, in a server architecture.

Each processing operation for a processing (creating, deactivating, splitting, joining and switching) is registered in the monitoring entity 2 and appended there in unchangeable form to a list of previous processing operations for masked electronic coin data records $Z_i$. The individual operations or their check results, that is to say the intermediate results of processing, are recorded in the monitoring entity 2.

The processing of "creating" and "deactivating", which concerns the existence of the monetary amount $v_i$ per se, that is, the creation and destruction of money, require additional approval by the issuing entity 1 in order to be registered (i.e., logged) in the monitoring entity 2. The other processing operations (splitting, joining, switching) do not require any authorization by the issuing entity 1 or by the command initiator (=payer, for example the first terminal M1).

The registration of the respective processing in the monitoring entity 2 is realized, for example, by means of corresponding list entries in the database according to FIG. 2. Each list entry has further markings 25 to 28 documenting the intermediate results of the respective processing that must be carried out by the monitoring entity 2. The markings 25 to 28 are preferably used as an aid and are discarded by the checking entity after the commands have been completed. What remains then are markings (not shown) regarding the validity of the (masked) electronic coin data records from columns 22a, 22b, 23a and/or 23b. When a processing command is received, these markings are, for example, in the "-" status and are set to the "1" status after all checks have been successfully completed and to the "0" status if at least one check has failed. A possible structure for a list entry of a coin data record includes, for example, two columns 22a, 22b for a predecessor coin data record (O1, O2), two columns 23a, 23b for a successor coin data record (S1, S2), a signature column 24 for the issuer entity(entities) 1, and four marking columns 25 to 28. Each of the entries in columns 25 to 28 has three alternative status "-", "1" or "0". Column 25 (0 flag) indicates whether a validity check with regard to an electronic coin data record in column 23a/b was successful, with status "1" meaning that a validity check showed that the electronic coin data record in column 23a/b is valid and status "0" indicating that a validity check showed that the electronic coin data record in column 23a/b is invalid and status "-" shows indicating a validity check has not yet been completed. Column 26 (C flag) indicates whether a calculation to check the amount neutrality of the masked electronic coin data records of the command was successful. The status "1" means that a calculation was successful and the status "0" indicates that the calculation was not successful and the status "-" indicates that a validity check has not yet been completed.

For example, the calculation to be performed in column 26 is:

$$(Z_{O1} + Z_{O2}) - (Z_{S1} + Z_{S2}) == 0 \tag{10}$$

Column 27 (R flag) indicates whether a check of the range proof(s) was successful, where status "1" means that a validity check showed that the range proof(s) are confirmable and status "0" indicates that a validity check showed that the range proof(s) could not be reproduced and status "-" indicates that a validity check has not yet been completed. Column 28 (S flag) shows the successful verification of the signature. Status "1" means that a validity check showed that the signature could be identified as that of the issuer entity and status "0" indicates that a validity check showed that the signature could not be identified as that of the issuer entity and status "-" indicates that a validity check has not yet been completed.

A change in the status of one of the markings (also referred to as "flags") requires approval by the monitoring entity 2 and must then be stored in the monitoring entity 2 in an unchangeable manner. Processing is final if and only if the required markings 25 to 28 have been validated by the monitoring entity 2, i.e. have changed from state "0" to state "1" or state "1" after the corresponding check.

In order to determine whether a masked electronic coin data record Z is valid, the monitoring entity 2 searches—in the present variant—for the last change that affects the masked electronic coin data record. It is essential that the masked electronic coin data record Z is valid if and only if the masked electronic coin data record Z is listed for its last processing in one of the successor columns 23a, 23b and this last processing has the corresponding final marking 25 to 28. It is also essential that the masked electronic coin data record Z is valid if and only if the masked electronic coin data record Z is listed for its last processing in one of the predecessor columns 22a, 22b and this last processing failed, i.e. at least one of the correspondingly requested states of the markings 25 to 28 is set to "0".

It is also essential that the masked electronic coin data record Z is not valid for all other cases, for example if the masked electronic coin data record Z is not found in the monitoring entity 2; or if the last processing of the masked electronic coin data record Z is listed in one of the successor columns 23a, 23b, but this last processing never became final; or if the last processing of the masked electronic coin data record Z is in one of the predecessor columns 22a, 22b and this last processing is final.

The checks by the monitoring entity 2 to check whether processing is final are shown in columns 25 to 28: The status in column 25 indicates whether the masked electronic coin data record(s) are valid according to predecessor columns 22a, 22b. The status in column 26 indicates whether the calculation for amount neutrality, for example according to equation (10), is correct. The status in column 27 indicates whether the range proof for the masked electronic coin data records Z could be checked successfully. The status in column 28 indicates whether the signature in column 24 of the masked electronic coin data record Z is a valid signature of the issuer entity 1.

The status "0" in one of columns 25 to 28 indicates that the check was not successful. The status "1" in one of columns 25 to 28 indicates that the check was successful. The status "-" in one of columns 25 to 28 indicates that no check has been carried out. The status may also have a different value, as long as it is possible to clearly differentiate between success/failure of a check and it is clear whether a certain check was carried out.

As an example, five different processing operations are defined, which are explained in detail here. Reference is made to the corresponding list entry in FIG. 2.

One processing operation is, for example, "creating" an electronic coin data record $C_i$. The creation in the direct transaction layer 3 by the issuer entity 1 includes choosing a monetary amount $\upsilon_i$ and creating a concealment amount $r_i$, as has already been described with equation (1). As shown in FIG. 2, no entries/markings are required in columns 22a, 22b, 23b and 25 to 27 during the "create" processing. The masked electronic coin data record $Z_i$ is registered in the successor column 23a. This registration is preferably carried out before the transmission to a terminal M1 to M3, in particular or already during creation by the issuer entity 1, wherein equation (3) must be executed in both cases. The masked electronic coin data record $Z_i$ is signed by the issuer entity 1 when it is created; this signature is entered in column 24 to ensure that the electronic coin data record $C_i$ was actually created by an issuer entity 1, although other methods may also be used for this purpose. If the signature of a received $Z_i$ matches the signature in column 24, the marking is set in column 28 (from "0" to "1"). The markings according to columns 25 to 27 do not require a status change and can be ignored. The range proof is not required since the monitoring entity 2 trusts that the issuing entity 1 does not issue any negative monetary amounts. In an alternative embodiment, however, it may be sent by the issuing entity 1 in the create command and checked by the monitoring entity 2.

A processing operation is, for example, "deactivating". The deactivation, that is to say the destruction of money, has the effect that the masked electronic coin data record $Z_i$ becomes invalid after the issuer entity 1 has successfully executed the deactivate command. The (masked) electronic coin data record to be deactivated can therefore no longer be processed further in the monitoring layer 4. In order to avoid confusion, the corresponding (unmasked) electronic coin data records $C_i$ should also be deactivated in the direct transaction layer 3. When "deactivating", the predecessor column 22a is written with the electronic coin data record $Z_i$, but no subsequent column 23a, 23b is used. When being deactivated, the masked electronic coin data record $Z_i$ must be checked to see whether the signature matches the signature according to column 24 in order to ensure that the electronic coin data record $C_i$ was actually created by an issuer entity 1, although other means may be used for this check. If the signed $Z_i$, which is sent with the deactivate command, can be confirmed as signed by the issuer entity 1, the marking 28 is set (from "0" to "1"). The markings according to columns 26 to 27 do not require a status change and can be ignored. The markings according to columns 25 and 28 are set after appropriate checking.

A processing operation is, for example, "splitting". Splitting, that is dividing an electronic coin data record $Z_i$ into two electronic partial coin data records $Z_j$ and $Z_k$, is initially carried out in the direct transaction layer 3, as shown in FIG. 3, wherein the monetary amounts $\upsilon_j$ and the concealment amount $r_j$ are generated. $\upsilon_k$ and $r_k$ result from equations (7) and (8). In the monitoring entity 2, the markings 25 to 27 are set, the previous column 22a is written with the electronic coin data record $Z_i$, the next column 23a is written with $Z_j$ and the next column 23b is written with $Z_k$. The status changes required according to columns 25 to 27 take place after the corresponding check by the monitoring entity 2 and document the respective check result. The marking according to column 28 is ignored.

One processing operation is, for example, "joining". Joining, i.e. merging two electronic coin data records $Z_i$ and $Z_j$ to form one electronic coin data record $Z_m$, is initially carried out in the direct transaction layer 3, as shown in FIG.

4, wherein the monetary amount $v_m$ and the concealment amount $r_m$ are calculated. In the monitoring entity 2, the markings 25 to 27 are set, the previous column 22a is written with the electronic coin data record $Z_i$, the previous column 22b is written with $Z_j$ and the next column 23b is written with $Z_m$. The markings in columns 25 to 27 require status changes and monitoring entity 2 carries out the corresponding checks. A range proof must be provided to show that no new money has been created. The marking according to column 28 is ignored.

One processing operation is, for example, "switching". Switching is necessary if an electronic coin data record has been transmitted to another terminal and a renewed issue by the transmitting terminal (here M1) is to be excluded. When switching, also called "switch", the electronic coin data record $C_k$ received from the first terminal M1 is exchanged for a new electronic coin data record $C_l$ with the same monetary amount. The new electronic coin data record $C_1$ is generated by the second terminal M2. This switch is necessary in order to invalidate (make invalid) the electronic coin data record $C_k$ received from the first terminal M1, thereby preventing the same electronic coin data record $C_k$ from being output again. This is because, as long as the electronic coin data record $C_k$ has not been switched, the first terminal M1 can pass this electronic coin data record $C_k$ to a third terminal M3 since the first terminal M1 has knowledge of the electronic coin data record $C_k$. Switching is carried out, for example, by adding a new concealment amount $r_{add}$ to the concealment amount $r_k$ of the obtained electronic coin data record $C_k$, whereby a concealment amount $r_l$ is obtained which only the second terminal M2 knows. This may also carried out in the monitoring entity 2. To prove that only a new concealment amount $r_{add}$ was added to the concealment amount $r_k$ of the masked received electronic coin data record $Z_k$, but the monetary amount remained the same, so that equation (11):

$$v_k = v_l \tag{11}$$

is valid, the second terminal M2 must be able to prove that $Z_l - Z_k$ can be represented as a scalar multiple of G, i.e. as $r_{add}*G$. This means that only a concealment amount $r_{add}$ was generated and the monetary amount of $Z_l$ is equal to the monetary amount of $Z_k$, i.e. $Z_l = Z_k + r_{add}*G$. This is done by generating a signature with the public key $Z_l - Z_k = r_{add}*G$.

In FIG. 3, an embodiment of a payment system according to the invention for splitting and switching of electronic coin data records is shown. In FIG. 3, the first terminal M1 has received the coin data record $C_i$ and would now like to carry out a payment transaction not with the entire monetary amount $v_i$, but only with a part $v_k$ thereof. For this purpose, the coin data record $C_i$ is split. To do this, the monetary amount is split first:

$$v_i = v_j + v_k \tag{12}$$

Here, each of the received amounts $v_j$, $v_k$ must be greater than 0 because negative monetary amounts are not permitted. In addition, new concealment amounts are derived:

$$r_i = r_j + r_k \tag{13}$$

The masked coin data records $Z_j$ and $Z_k$ are then obtained from the coin data records $C_j$ and $C_k$ in accordance with equation (3) and are registered in the monitoring entity 2. For the split, the predecessor column 22a is described with the coin data record $Z_i$, the successor column 23a with $Z_j$ and the successor column 23b with $Z_k$. The markings in columns 25 to 27 require a status change and the monitoring entity 2 carries out the corresponding checks. The marking according to column 28 is ignored.

Then a coin data record, here $C_k$, is transmitted from the first terminal M1 to the second terminal M2. In order to prevent double spending, a switch operation is useful in order to exchange the electronic coin data record $C_k$ received from the first terminal M1 for a new electronic coin data record $C_l$ with the same monetary amount. The new electronic coin data record $C_l$ is generated by the second terminal M2. The monetary amount of the coin data record $C_l$ is adopted and not changed, see equation (11). Then, according to equation (14), a new concealment amount $r_{add}$ is added to the concealment amount $r_k$ of the received electronic coin data record $C_k$, $$r_l = r_k + r_{add} \tag{14}$$

whereby a concealment amount $r_l$ which only the second terminal M2 knows is obtained. In order to prove that only a new concealment amount $r_{add}$ was added to the concealment amount $r_k$ of the received electronic coin data record $Z_k$, but the monetary amount remained the same ($v_k = v_l$), the second terminal M2 must be able to prove that $Z_l - Z_k$ can be represented as a multiple of G. This is done using the public signature $R_{add}$ according to equation (15):

$$R_{add} = r_{add} \cdot G = Z_l - Z_k = (v_l - v_k) * H + (r_k + r_{add} - r_k) * G \tag{15}$$

where G is the generator point of the ECC. Then the coin data record $C_l$ to be switched is masked by means of equation (3) in order to obtain the masked coin data record $Z_l$. The private signature $r_{add}$ may then be used in the monitoring entity 2 in order, for example, to sign the masked electronic coin data record $Z_l$ to be switched, which is valid as proof that the second terminal M2 has only added a concealment amount $r_{add}$ to the masked electronic coin data record and no additional monetary value, i.e., $v_l = v_k$.

The proof is as follows:

$$Z_k = v_k \cdot H + r_k \cdot G \tag{16}$$

$$Z_l = v_l \cdot H + r_l \cdot G = v_k \cdot H + (r_k + r_{add}) \cdot G$$

$$Z_l - Z_k = (r_k + r_{add} - r_k) \cdot G = r_{add} \cdot G$$

FIG. 4 shows an exemplary embodiment of a payment system according to the invention for joining electronic coin data records. The two-coin data records $C_i$ and $C_j$ are received in the second terminal M2. Similar to the split according to FIG. 3, a new coin data record $Z_m$ is now obtained by adding both the monetary amounts and the concealment amount of the two-coin data records $C_i$ and $C_j$. Then, the received coin data record $C_m$ to be joined is masked and the masked coin data record $Z_m$ is registered in the monitoring entity.

In FIGS. 3 and 4, the variant of a database of the monitoring entity 2 which contains a list of processing operations of the masked coin data records is shown again. Other variants of a database, for example masked coin data records with status or only valid masked coin data records, may also be used—as already mentioned with respect to FIG. 2.

Figure 5:
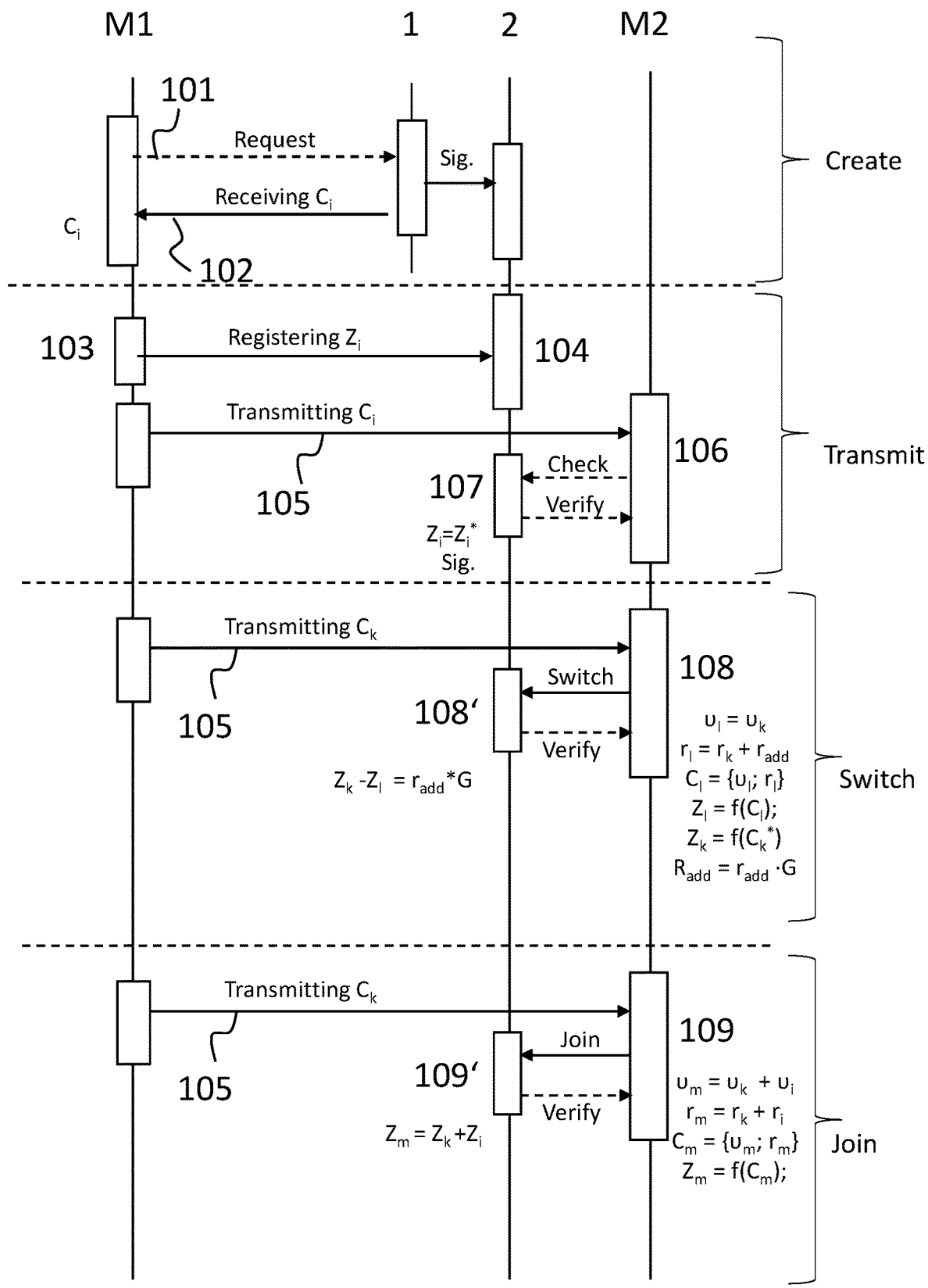
FIG. 5 shows an exemplary embodiment of a method flow diagram of a method according to the invention and corresponding processing steps of a coin data record.
Figure 6:
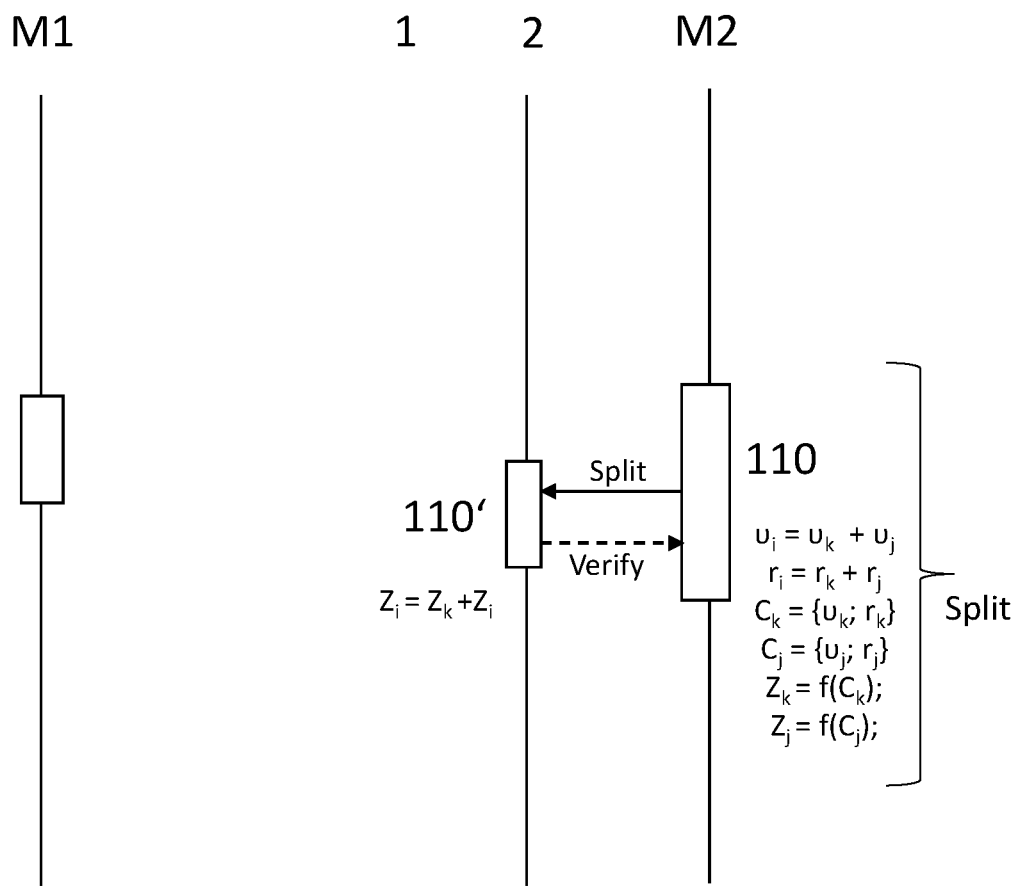
FIG. 6 shows an embodiment of a method flow diagram of a method according to the invention and corresponding processing steps of a coin data record.
Figure 7:
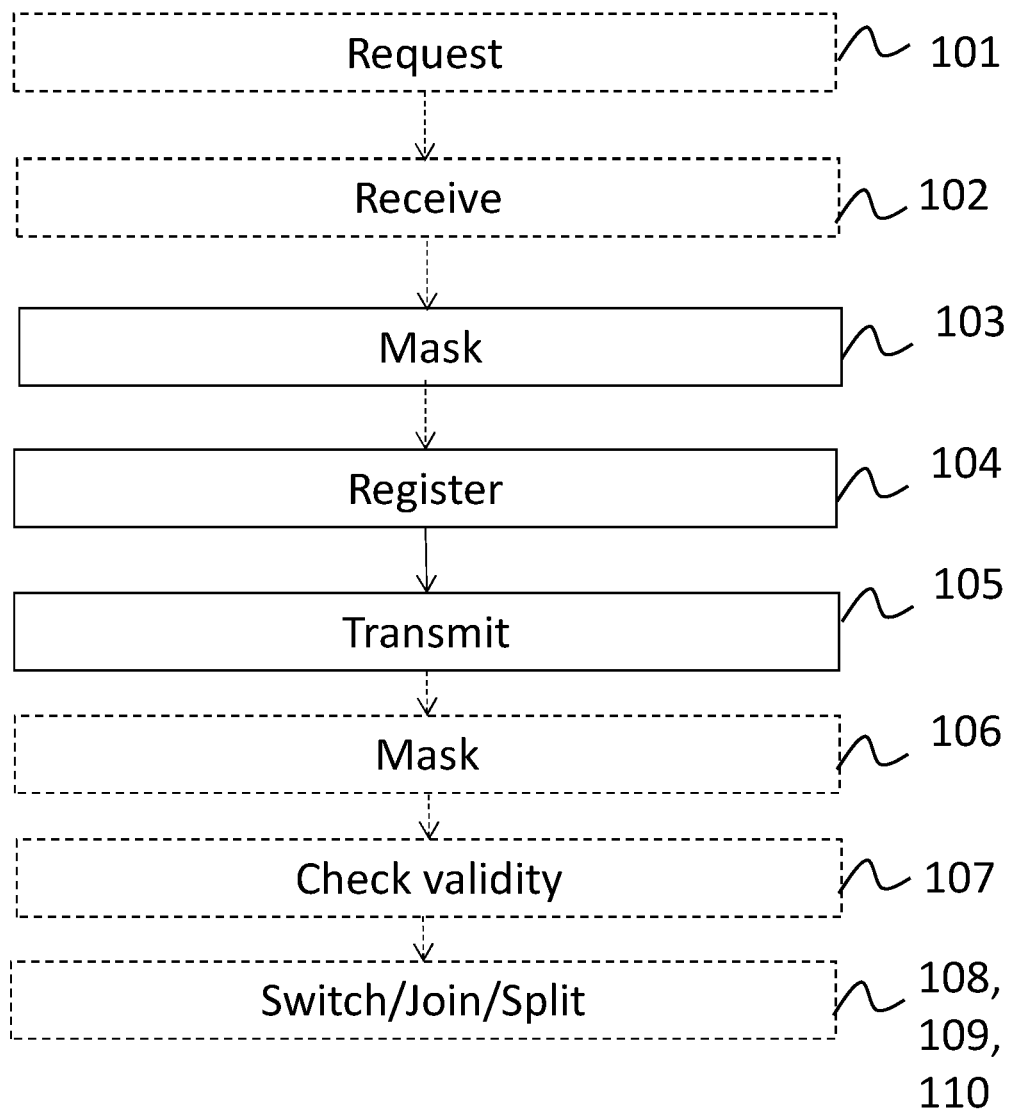
FIG. 7 shows a further exemplary embodiment of a method flow diagram of a method according to the invention.

FIGS. 5 to 7 are each exemplary embodiments of a method flow chart of a method 100 according to the invention. Both FIGS. 5 and 6 are explained together below.

Steps 101 to 104 are optional for the further method and are described using the example of the terminal M1. In the optional steps 101 and 102, a coin data record is requested and provided by the issuer entity 1 to the first terminal M1 after the electronic coin data record has been created. A signed masked electronic coin data record is sent to the monitoring entity 2 in step 103. In step 103, the received electronic coin data record $C_i$ is masked in accordance with equation (3) and as explained in FIG. 1. Then, in step 104, the masked electronic coin data record $Z_i$ is registered in the monitoring entity 2. It could be envisioned that masked electronic coin data records are only valid in the monitoring entity when they are registered by a participant such as a terminal device or server. Alternatively, as explained in relation to FIG. 1, the masked electronic coin data record $Z_i$ may already be registered in the monitoring entity 2 as a valid masked electronic coin data record after step 102. Optionally, the terminal M1 may switch the received electronic coin data record with step 104, as will be described in more detail in step 108.

In step 105, the coin data record $C_i$ is transmitted in the direct transaction layer 3 to the second terminal M2. In the optional steps 106 and 107, a validity check is carried out with previous masking, in which case the monitoring entity 2 confirms the validity of the coin data record $Z_i$ or $C_i$ in case of success.

In step 108, a received coin data record $C_k$ is switched (the received coin data record $C_i$ could of course also be switched) to a new coin data record $C_l$, whereby the coin data record $C_k$ becomes invalid and double spending is prevented. For this purpose, the monetary amount $v_k$ of the transmitted coin data record $C_k$ is used as the "new" monetary amount $v_l$. In addition, as already explained with equations (14) to (17), the concealment amount $r_l$ is created. The additional concealment amount $r_{add}$ is used to prove that no new money (in the form of a higher monetary amount) was generated by the second terminal M2. Then, among other things, the masked coin data record $Z_l$ to be switched is sent to the monitoring entity 2 and the switch from $C_k$ to $C_l$ is instructed.

The corresponding check is carried out in the monitoring entity 2 in step 108'. $Z_k$ is entered in column 22a according to the table in FIG. 2 and the coin data record $Z_l$ to be rewritten is entered in column 23b. Then, a check in the monitoring entity 2 as to whether $Z_k$ is (still) valid, i.e. whether the last processing of $Z_k$ is entered in one of the columns 23a/b (as proof that $Z_k$ was not further split or deactivated or joined) and whether a check for the last processing failed. In addition, $Z_l$ is entered in column 23b and the markings in columns 25, 26, 27 are initially set to "0". A check is now carried out as to whether $Z_l$ is valid, in which case the check according to equations (16) and (17) may be used. In case of success, the marking in column 25 is set to "1", otherwise to "0". A check is now carried out, and the calculation according to equation (10) shows that $Z_k$ and $Z_l$ are valid and the marking in column 26 is set accordingly. It is also checked whether the ranges are coherent, and then the marking in column 27 is set. If all three checks were successful and this was accordingly committed in the monitoring entity 2, the coin data record is considered to be switched. This means that the coin data record $C_k$ is no longer valid, and the coin data record $C_l$ is valid from now on. Double spending is no longer possible if a third terminal M3 asks the monitoring entity 2 about the validity of the (doubly dispensed) coin data record.

In general—slightly different from the illustration in FIG. 5—the electronic coin data records $C_i$ created by the issuer entity are transmitted (issued) to an entity (such as server, computer . . . ) of a commercial bank. The (server) entity of the commercial bank provides the electronic coin data records for terminals. The terminal M1 requests and then receives the electronic coin data record from the entity of the commercial bank in steps 101 and 102. In particular, when the terminal M1 requests and receives the electronic coin data record $C_i$ from a server of a commercial bank, already switching in step 104 is useful.

In step 109, two coin data records $C_k$ and $C_i$ are joined to form a new coin data record $C_m$, as a result of which the coin data records $C_k$, $C_i$ become invalid and double spending is prevented. For this purpose, the monetary amount $v_m$ is formed from the two monetary amounts $v_k$ and $v_i$. For this purpose, the concealment amount $r_m$ is formed from the two concealment amounts $r_k$ and $r_i$. In addition, the masked coin data record to be joined is obtained by means of equation (3) and it (together with other information) is sent to the monitoring entity 2 and the joining is requested as processing.

In step 109' the corresponding check is carried out in the monitoring entity 2. In this case, $Z_m$ is entered in column 23b according to the table in FIG. 2. The monitoring entity 2 then checks whether $Z_k$ and $Z_i$ are (still) valid, i.e. whether the last processing of $Z_k$ or $Z_i$ is entered in one of the columns 23a/b (as proof that $Z_k$ and $Z_i$ are not further split or deactivated or joined) and whether a check for the last processing failed. In addition, the markings in columns 25, 26, 27 are initially set to "0". A check is now made as to whether Zm is valid, in which case the check according to equations (16) and (17) may be used. In case of success, the marking in column 25 is set to "1", otherwise to "0". A check is now carried out, and the calculation according to equation (10) shows that $Z_i$ plus $Z_k$ is equal to $Z_m$ and the marking in column 26 is set accordingly. It is also checked whether the ranges are consistent, and then the marking in column 27 is set.

In step 110, a coin data record $C_i$ is split into two partial coin data records $C_k$ and $C_j$, whereby the coin data record $C_i$ is made invalid, and the two split partial coin data records are to be made valid. For this purpose, the monetary amount $v_i$ is split into the two monetary amounts $v_k$ and $v_j$. For this purpose, the concealment amount $r_i$ is split into the two concealment amounts $r_k$ and $r_j$. In addition, the masked partial coin data records $Z_k$ and $Z_j$ are obtained by means of equation (3) and these are sent with additional information, for example the range proofs, to the monitoring entity 2 and the splitting is requested as processing.

In step 110', the corresponding check is carried out in the monitoring entity 2. $Z_j$ and $Z_k$ are entered in the columns 23a/b according to the table in FIG. The monitoring entity 2 then checks whether $Z_i$ is (still) valid, i.e. whether the last processing of $Z_i$ is entered in one of the columns 23a/b (as proof that $Z_i$ has not been further split or deactivated or joined) and whether a check for the last processing failed. In addition, the markings in columns 25, 26, 27 are initially set to "0". A check now takes place as to whether $Z_j$ and $Z_k$ are valid, in which case the check according to equations (16)

and (17) may be used. n case of success, the marking in column 25 is set to "1". A check is now carried out, and the calculation according to equation (10) shows that $Z_i$ is equal to $Z_k$ plus $Z_j$ and the marking in column 26 is set accordingly. It is also checked whether the ranges are consistent, and then the marking in column 27 is set.

Figure 8:
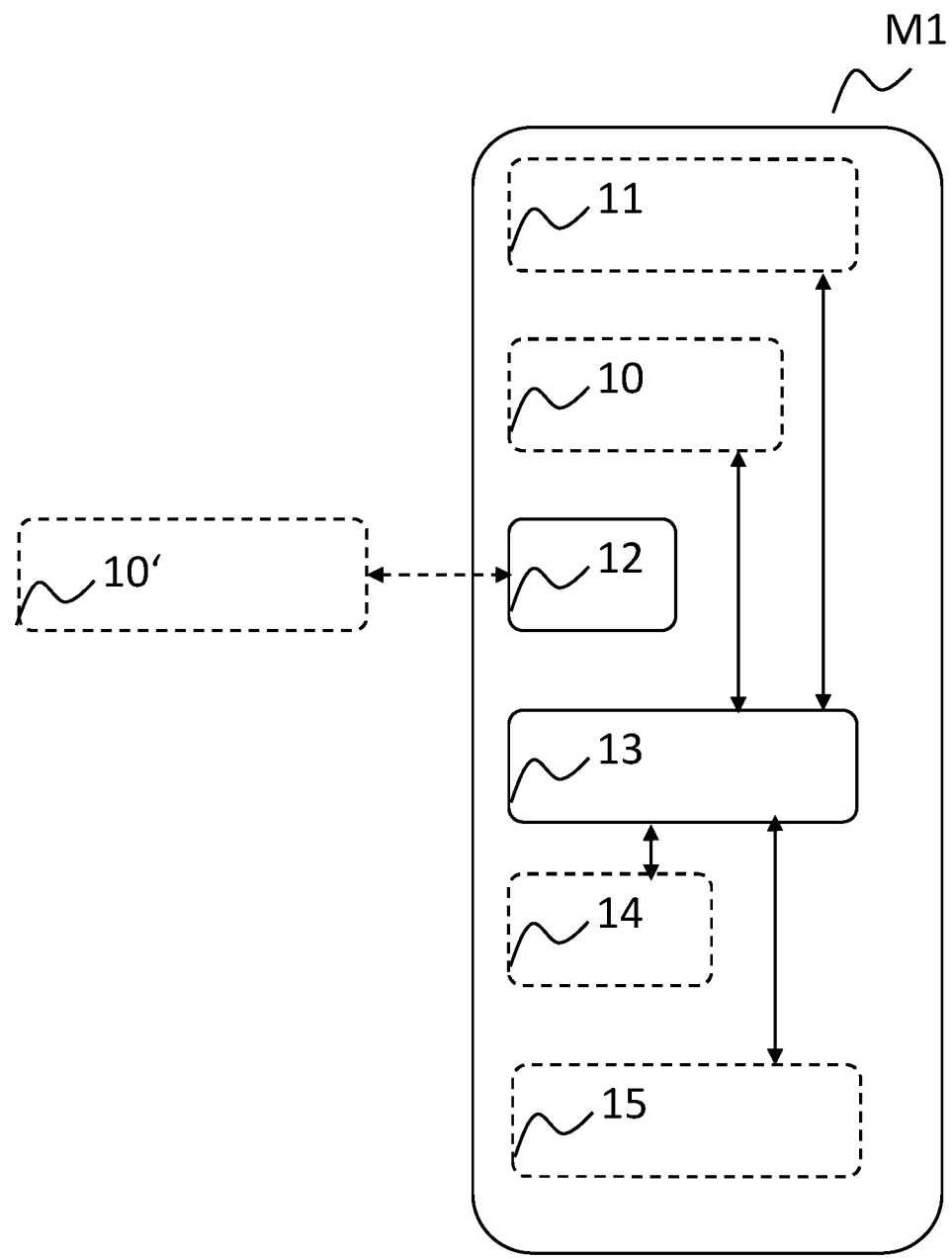
FIG. 8 shows an embodiment of a device according to the invention.

In FIG. 8, an embodiment of a device M1 according to the invention is shown. The device M1 may store electronic coin data records $C_i$ in a data memory 10, 10'. The electronic coin data records $C_i$ may be on the data storage 10 of the device M1 or be available in an external data storage 10'. When using an external data storage 10', the electronic coin data records $C_i$ could be stored in an online storage, for example a data storage 10' from a provider for digital wallets. In addition, private data storage media, for example network-attached storage, NAS, could also be used in a private network.

In one case, the electronic coin record $C_i$ is shown as a printout on paper. The electronic coin data record may be represented by a QR code, an image of a QR code, or it may also be a file or a character string (ASCII).

The device M1 has at least one interface 12 available as a communication channel for outputting the coin data record $C_i$. This interface 12 is, for example, an optical interface, for example for displaying the coin data record $C_i$ on a display unit (display), or a printer for printing the electronic coin data record $C_i$ as a paper printout. This interface 12 may also be a digital communication interface, for example for near-field communication such as NFC, Bluetooth, or an Internet-compatible interface such as TCP, IP, UDP, HTTP or access to a chip card as a security element. This interface 12 is, for example, a data interface so that the coin data record $C_i$ is transmitted between devices via an application, for example an instant messenger service, or as a file or as a character string.

Moreover, the interface 12 or a further interface (not shown) of the device M1 is configured to interact with the monitoring entity 2 according to the description in FIGS. 1 to 6. The device M1 is preferably capable to be online for this purpose.

In addition, the device M1 may also have an interface for receiving electronic coin data records. This interface is configured to receive visually presented coin data records, for example by means of an acquisition module such as a camera or scanner, or digitally presented coin data records, received via NFC, Bluetooth, TCP, IP, UDP, HTTP, or to receive coin data records presented by means of an application.

The device M1 also comprises a computing unit 13 which can carry out the above-described method for masking coin data records and the processing on coin data records.

The device M1 is capable to be online and may preferably recognize when it is connected to a WLAN by means of a location recognition module 15. Optionally, a specific WLAN network may be marked as preferred (=location zone) so that the device M1 only performs special functions when it is registered in this WLAN network. Alternatively, the location recognition module 15 recognizes when the device M1 is in predefined GPS coordinates including a defined radius and carries out the special functions according to the location zone thus defined. This location zone may either be entered manually into the device M1 or introduced via other units/modules into the device M1. The special functions that the device M1 performs when the location zone is recognized are, in particular, transmitting electronic coin data records from/to the external data memory 10 from/to a safe module 14 and, if necessary, transmitting masked coin data records Z to the monitoring entity 2, for example in the context of the above processing of a coin data record.

In the simplest case, all coin data records $C_i$ are automatically joined to form one coin data record in the terminal M1 after receipt (see join processing or joining step). That is, as soon as a new electronic coin data record is received, a join or switch command is sent to the monitoring entity 2. The device M1 may also prepare electronic coin data records in algorithmically determined denominations and hold them in the data storage 10, 10' so that a payment process is possible even without a data connection to the monitoring entity 2.

Figure 9:
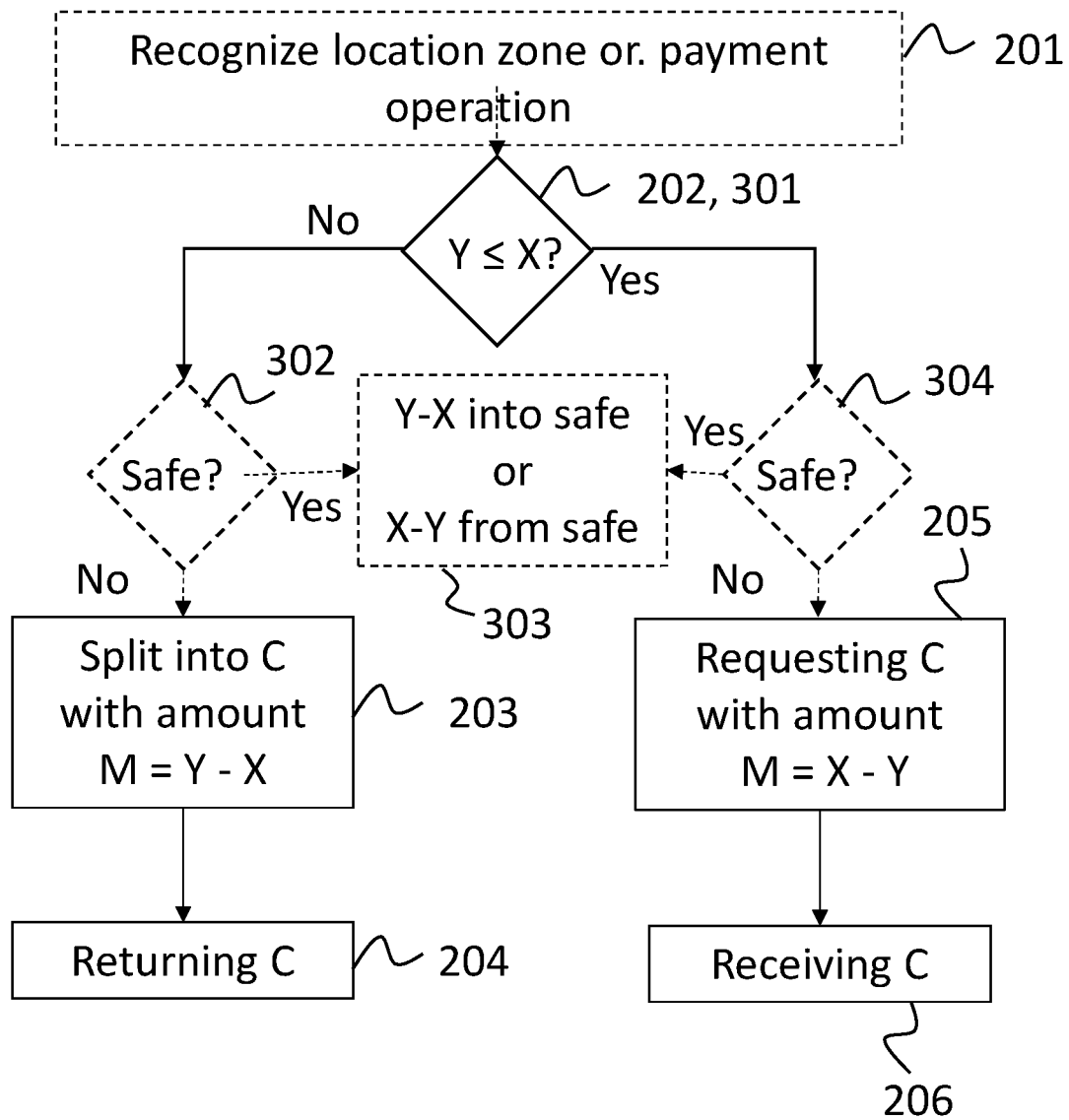
FIG. 9 shows a further exemplary embodiment of a method flow diagram of a method according to the invention.

FIG. 9 shows an exemplary embodiment of a method flow chart of a method 200 according to the invention. The coin data records $C_i$ are managed in the device M1 as follows.

As described above, the device M1 may recognize a predefined location zone by means of the location recognition module 15, step 201. In this location zone, the terminal M1 may then automatically be charged or discharged to a predefined threshold value, i.e. a fixed limit X, of monetary amounts $v_i$ in the form of electronic coin data records $C_i$. For this purpose, the device M1 is personalized. For this purpose, bank details (bank account data) or a safe module and the threshold value X are specified via an interface. The user may have to authenticate herself or himself at the bank account or a safe module in order to withdraw monetary amounts from the bank account by direct debit or to transfer them to the bank account or to receive coin data records from the safe module or to send them to the safe module.

The goal of the method 200 is to always have the threshold value X available in the device as a monetary amount—in a single (joined) electronic coin data record or in all electronic coin data records.

In the terminal M1, all coin data records $C_i$ may be automatically joined to form one coin data record after receiving a coin data record (see joining step). For example, a coin data record $C_i$ with a monetary amount $v_i$ greater than the threshold value X (here abbreviated to Y) can be obtained by joining. If the specification is no longer met, for example in the case no in step 202 of FIG. 9, the device M1 splits, in step 203 the coin data record $C_i$ so that a first electronic partial coin data record with the monetary amount X and a second electronic (partial) coin data record C with the monetary amount M=Y−X is obtained. The two partial coin data records are also registered in the monitoring entity 2. The second (partial) coin data record C is returned to the issuer entity in step 204. The issuing entity credits the monetary amount M to the user's bank account; this can be done, for example, by means of a credit or a transfer. If an electronic coin data record with (exactly or approximately) the monetary amount M is already present in the device, step 203 may be omitted, and this coin data record may be returned 204 directly.

In a further variant, not shown in the figure, a transfer is triggered with which a difference between the monetary amount Y and the threshold value X (for a monetary amount) is credited to the pre-personalized bank account. At the same time, the joined coin $C_i$ is split (splitting step) and the correspondingly masked partial coin data records are sent to the monitoring entity 2 in order to send the credited partial coin data record (Y−X) to the safe module or the transferring party.

If—according to the case yes in step 202—a coin data record $C_i$ with a monetary amount less than the threshold value X is held in the device M1 (for example, if the payment was made with an amount X−Y), the device M1 requests a direct debit in step 205, with which a difference between the threshold value X and the monetary amount Y of the stored coin data record $C_i$ is withdrawn from the bank account. At the same time, the device M1 receives a new coin data record from the issuer entity 1 in step 205, see creating step, as described above.

Alternatively or additionally to a threshold value as a specification, there may also be a denomination specification. The denomination specification defines how many electronic coin data records with which denomination (i.e. with which monetary amount) should be available in the device. The sequence of the method 200 may essentially be analogous. Simply put, either missing electronic coin data records are requested and received or excess electronic coin data records are returned. In an optional preliminary step, electronic coin data records may be generated according to the denomination specification by splitting and joining.

The method steps of method 300 are also shown in FIG. 9. Access to a safe module 14 of the device M1 is provided. In the case of no in step 301, the amount Y–X is written into the safe module 14 in step 302. In the case yes in step 301, the amount Y–X is loaded from the safe module 14 in step 303. For this purpose, the user must be authenticated.

Here, the safe module 14 is a data storage which can be accessed after additional successful authentication. This safe module 14 may either be in the device M1, e.g. an area that is protected by additional security functions, or the safe module 14 is external to the device M1, for example on the server of a trusted third party that offers the safe module function. The safe module 14 may process coin data records and have them registered with the monitoring entity 2.

Figure 10:
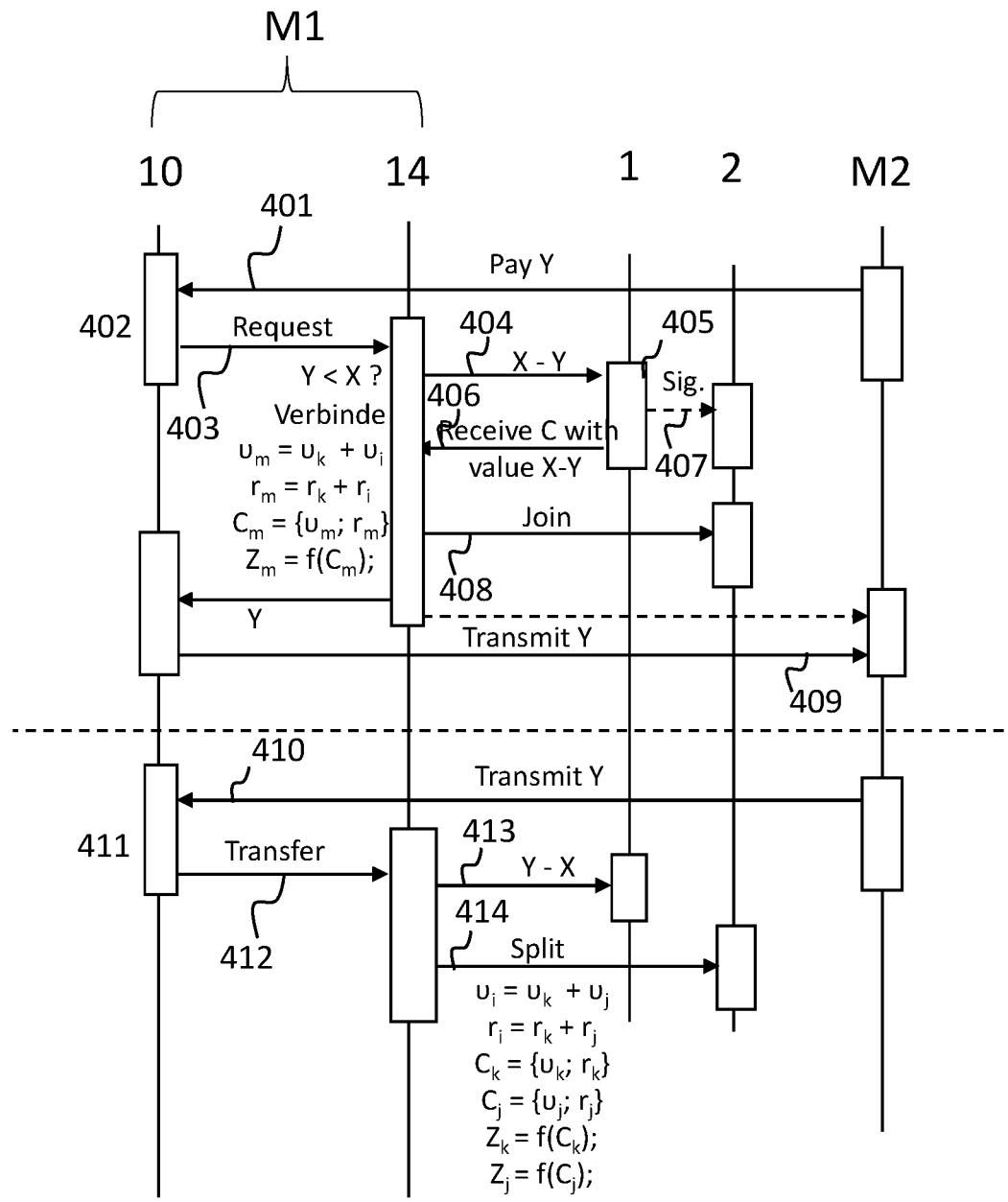
FIG. 10 shows a further exemplary embodiment of a method flow diagram of a method according to the invention.

FIG. 10 shows a further exemplary embodiment of a method flow chart of a method 400 according to the invention. The device M1 includes a data storage 10 and a safe module 14. Another device M2 requests payment of an amount Y in step 401. Device M1 recognizes in step 402 that it does not have the amount Y in the data storage 10 because it is greater than the predefined threshold value X. M1 therefore requests the amount Y–X (or Y) fully automatically from the safe module 14 in step 403. If the amount Y–X (or Y) is present in the safe module 14 (not shown here), it is transmitted from the device M1 to the device M2, either with previous transmission of the amount from the safe module 14 to the device M1 or by direct transmission from the safe module 14 to the other device M2. In addition to the coin data record of the safe module with the monetary amount Y–X, the device M1 will transmit the coin data record with the amount X.

According to FIG. 10, the safe module 14 does not have the amount Y–X (or Y) in stock. The amount X in the safe module 14 is therefore less than the requested amount Y–X (or Y). Therefore, in step 404, the safe module requests a coin data record C with the monetary difference amount Y–X from the issuing entity 1 or (not shown) from another liquidity provider. The issuer entity 1 generates a corresponding coin data record C with the difference amount YX in step 405 and transmits it to the safe module 14 in step 406. In addition, the signed masked electronic coin data record is sent to the monitoring entity 2, see step 407 (see also FIGS. 1 to 7 for details). The issuer entity preferably maintains a large number of coin data records that have already been generated and registered, so that step 407 and the generation are omitted. The liquidity provider processes the request for an electronic coin data record of monetary value Y–X (not shown in FIG. 10). The following steps are carried out: after a splitting step, registering in the monitoring entity 2 in order to generate an electronic coin data record of the required monetary value; and sending the requested electronic coin data record to the safe module 14. The safe module 14 joins the coin data record X with the coin data record Y–X in order to obtain the amount Y as a new coin data record, see step 408 (see also FIGS. 1 to 7 for details). The joined coin data record Y is transmitted to the other device M2 in step 409, either directly from the safe module 14 or via the device M1. The flow chart in FIG. 10 above the dashed line also corresponds, for example, to method steps 202, 203, 204 or 301, 302 and 303 of FIG. 9.

The flow chart in FIG. 10 below the dashed line also corresponds, for example, to method steps 202, 205, 206 or 301, 303 and 304 of FIG. 9. Here, another device M2 transmits the payment of an amount Y in step 410 to device M1. The device M1 recognizes in step 411 that the amount Y exceeds the threshold value X. The device M1 therefore initiates the transfer of the corresponding surplus, here the transfer of the monetary amount XY, in step 412. For this purpose, the safe module 14 initiates the transfer to the bank 1 fully automatically in step 413 (in FIG. 10 the bank is also the issuing entity 1; the idea of the invention is not limited thereto). A splitting step is carried out by the safe module 14 and registered in the monitoring entity 2, see step 414 (see also FIGS. 1 to 7 for details). The step of splitting 414 may take place in parallel or before the step of transferring 413. In particular, a return or transmission of the split coin data record to the issuer entity may trigger the transfer.

Figure 11:
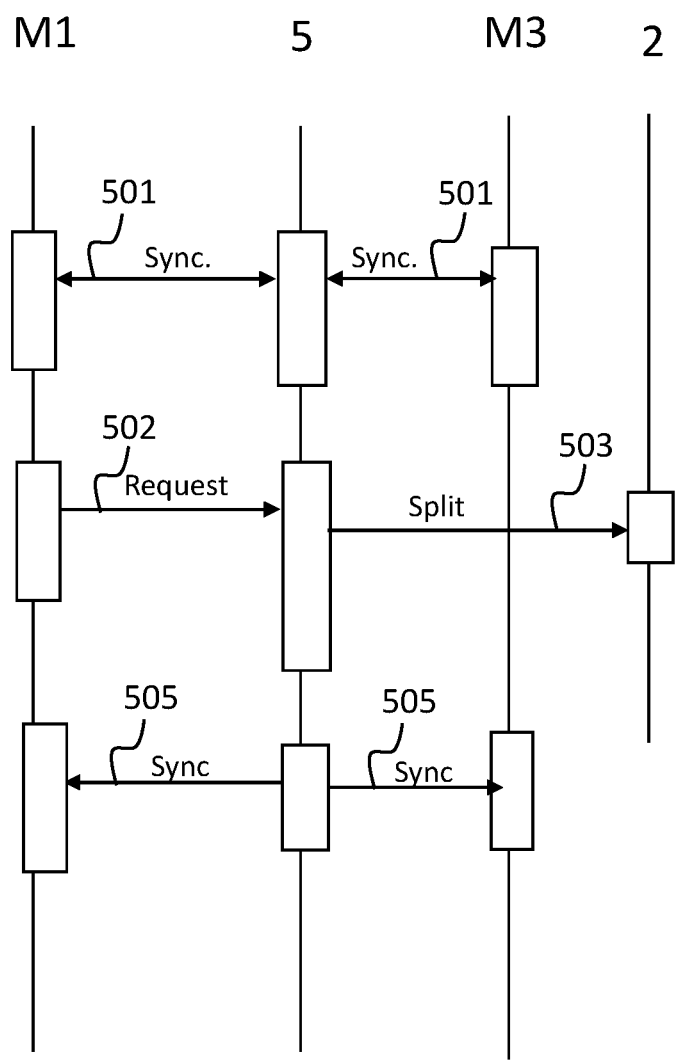
FIG. 11 shows a further exemplary embodiment of a method flow diagram of a method according to the invention.

FIG. 11 shows a further exemplary embodiment of a method flow chart of a method 500 according to the invention. The device M1 includes a data storage 10 for electronic coin data records $C_i$. Part of this storage 10 may be synchronized with other devices M3 by an application 5 that is installed and operational on each of the terminals M1, M3, see step 501. This means that different users of these synchronized devices M1, M3 have simultaneous access to the electronic coin data records $C_i$. They share the electronic coin data records $C_i$ stored in this part of the data storage 10.

In addition to the electronic coin data records $C_i$, identification data of the devices M1, M3 to be synchronized are also stored in the shared part of the data storage 10.

For synchronization, each device M1, M3 has this application 5—a shared digital wallet, so to speak. This application 5 ensures that information is communicated to the devices M1, M3. The application 5 is also in communication with the monitoring entity 2, see step 502.

In the system according to FIG. 11, electronic coin data records $C_i$ are not stored centrally in the application 5 for security reasons, but locally on each of the devices M1, M3. A device M1 may now have processing carried out on one of the shared electronic coin data records $C_i$ by means of the monitoring entity 2 via the application 5—that is to say the shared digital wallet. Upon request according to step 502, the application 5 contacts the monitoring entity 2 in step 503 as part of a splitting step (see FIGS. 1 to 7 for details) in order to have original electronic coin data records $C_i$ deactivated (= to be declared invalid) and in order to document correspondingly split or newly created masked coin data records in the monitoring entity 2 and to declare them valid. The application 5 then synchronizes the devices M1, M3 again in step 505.

Figure 12:
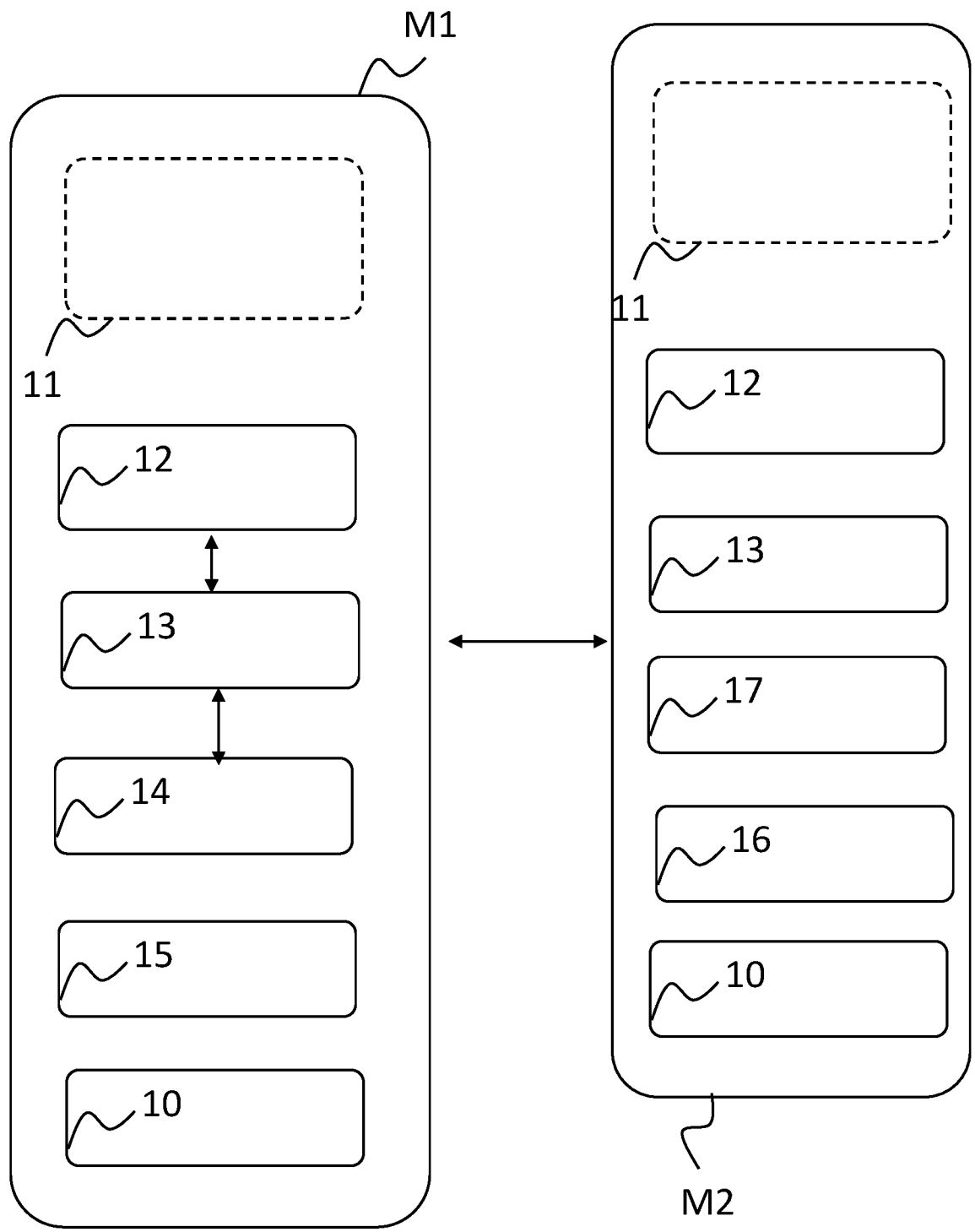
FIG. 12 shows a further embodiment of a device according to the invention with another device.

FIG. 12 shows an exemplary embodiment of a device M1 according to the invention in communication connection with another device M2 for transmitting monetary amounts in the form of coin data records. With regard to the device M1, reference is made to the description of FIG. 8. The other device M2 represents, for example, a machine that can receive and send electronic coin data records $C_i$ directly. In addition, it can calculate masked electronic coin data records, i.e. carry out a masking step for electronic coin data records. The other device M2 may communicate with a monitoring entity 2 (not shown). The other device M2 is, for example, a self-service terminal—similar to an ATM—or is a service system, such as a register system, consisting of a plurality of components. The other device M2 includes, for example, a card reader in order to be able to read security elements (chip cards, eUICC), by means of which a user can be identified unambiguously. In addition, the other device M2 includes a keyboard, for example. In addition, the other device includes, for example, an interface 12 for outputting coin data records which may completely correspond to the interface 12 or the interfaces of the device M1. Reference is therefore made here to any information on the device M1. For example, the interface 12 of the other device M2 is the output interface for optoelectronically detectable coin data records, for example a screen or a monitor; or a digital (protocol or data) interface, such as NFC, Bluetooth, TCP, IP, UDP, HTTP, or an interface for transmitting data records using an application, such as a text file, ASCII character string, instant messenger service or in accordance with a wallet application 5.

Furthermore, the other device M2 has one or more interfaces for receiving coin data records that correspond to the corresponding interface (s) of the device M1, for example an optical interface 11 (scanner or camera) or a digital interface, possibly combined with the digital interface for outputting coin data records Ci.

Furthermore, the other device M2 includes one or more interfaces for communicating with the monitoring entity 2, for example for transmitting masked coin data records $Z_i$.

Moreover, the device M2 includes, for example, an input and/or output module 16 for bank notes and/or a random number generator or an interface for receiving a random number. A register module 17 of the other device M2 is available, for example, for access to an account system of one (or more) commercial banks, whereby a user is also guaranteed access to his/her bank account. A cryptographic key for signing a deactivation processing is also optionally available in the other device M2. The other device M2 also includes a data storage 10 or means for accessing an external data storage 10'. The device M2 obtains valid electronic coin data records $C_i$ either from the data storage 10 or via the interface to an operator of the machine who manages the electronic coin data record $C_i$ in an external data storage 10 or via an exchange.

When paying with cash (e.g. at a register terminal), the user of the device M1 may receive the change as a combination of bank notes and electronic coin data records $C_i$.

In one case, the user receives part of the change as bank notes, rounded off to the next denomination of bank notes, and the second part of the change as an electronic coin data record $C_i$. This electronic coin data record(s) $C_i$ may be received electronically or as a printout. For this purpose, the register module 17 of the other device M2 informs the computing unit 13 of the other device M2 how much change is to be paid as an electronic coin data record $C_i$. The computing unit 13 of the other device M2 then carries out a splitting step and informs the monitoring entity 2 accordingly for registering the split partial coin data records. Optionally, the device M1 may confirm to the user, for example by vibrating or an optical signal, that the second part of the change has been received as an electronic coin data record $C_i$.

In an alternative case, the user of the device M1 receives part of the change as bank notes from the other device M2, rounded up to the next denomination. The device M1 then transmits "negative" change in the form of one or more electronic coin data records $C_i$ to the other device M2. Said electronic coin data record(s) $C_i$ may be output electronically or as a printout. For example, the user has an invoice for € 12.28 and pays with a € 20 bank note. The user of device M1 receives a € 10 banknote (=the next largest denomination) as cash. The device M1 transfers a monetary amount of € 2.28 as "negative change" to the device M2 in the form of an electronic coin data record $C_i$. Here, the register module 17 of the other device M2 informs the computing unit 13 of the other device M2 how much monetary amount υ must be requested from the device M1 in the form of an electronic coin data record $C_i$. The request is received in the device M1. The negative change is received in the other device M2 by means of a split command and the associated registration at the monitoring entity 2. The device M2 executes a switch command. Optionally, the device M1 may indicate a transaction confirmation to the user by, for example, vibrating or an optical signal.

Figure 13:
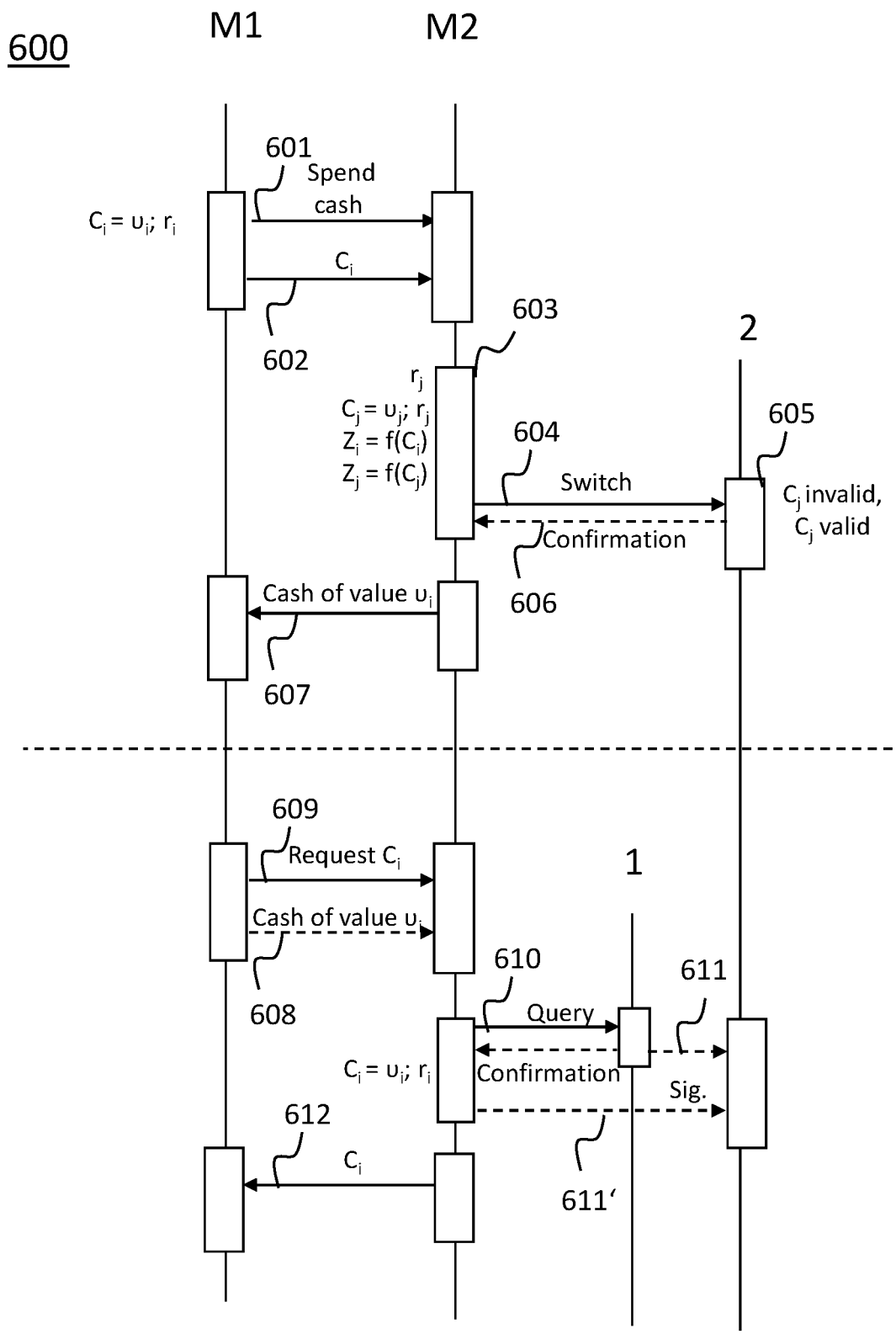
FIG. 13 shows a further exemplary embodiment of a method flow diagram of a method according to the invention.

FIG. 13 shows a further exemplary embodiment of a method flow chart of a method 600 according to the invention. A method for spending cash at another device M2 is shown above the dashed line. In this case, the other device M2 necessarily has an output compartment 16 for cash and can generate or obtain concealment amounts, that is to say random numbers r.

The device M1 holds an electronic coin data record $C_i$ and would like to convert this into cash in step 601. To this end, the user of the device M1 selects the "spend cash" function on the other device M2, if it is a self-service terminal. The device M1 transmits the electronic coin data record $C_i$ to the device M2 in step 602. The other device M2 receives the electronic coin data record $C_i$. The other device M2 generates a new entropy factor, here random number $r_j$, and uses it to form a new electronic coin data record $C_j$ as part of a switching step according to step 603, as described in detail in FIGS. 1 to 7. The other device M2 then calculates the masks $Z_i$ and $Z_j$ from $f(C_i)$ and $f(C_j)$ and switches the electronic coin data record $C_i$ to $C_j$, for which purpose the masked coin data records $Z_i$ and $Z_j$ are sent to the monitoring entity 2, see step 604. If the monitoring entity 2 does not carry out the switch (for example because a check required for the switch has failed, see above), the other device M2 rejects the request from the user of the device M1 (not shown here). If the monitoring entity 2 can register the switch (checks successful), the electronic coin data record $C_j$ is rewritten to the other device M2 in step 605 and $C_i$ becomes invalid. In step 606, the monitoring entity 2 confirms the switch. The other device M2 then outputs the monetary amount as cash, see step 607. The electronic coin data record $C_j$ is stored locally in the other device M2 or sent to the operator of the device M2. Optionally, the other device M2 (if authorized to do so) may register a deactivating step in the monitoring entity 2 via the masked electronic coin data record $Z_i$. This method 600 of issuing cash may be combined with the issuing of change described in FIG. 12 so that the other device M2 issues part of the monetary amount υ as bank notes from the bank note module 16 (either rounded up or down to the next denomination) and the remaining part as electronic coin data record C. This would save a splitting step for the device M1.

A method for withdrawing electronic coin data records $C_i$ from a bank account is shown below the dashed line in FIG. 13. In this case, either cash is deposited in the other device M2 via a bank note module 16 (step 608) or the value for $C_j$ is simply requested (step 609). In this case, the other device M2 allows the user of the device M1 access to his/her bank account at the bank 1 (at the same time also the issuing entity, without restricting the idea of the invention).

The user of the device M1 selects the function "withdraw electronic coin data record" on the device M2 and uses his/her security element (bank card, eUICC) or the like for authentication and/or identification. In this way, transfers, direct debits, credit card transactions or the like can be made. Here, in step 610, the funds in the bank account of the user of the first device M1 are queried and, if necessary, confirmed.

After the transaction has been carried out successfully, the device M2 receives an electronic coin data record $C_i$ from the issuer entity 1 (see FIGS. 1 to 7 for details). The issuer entity 1 may in particular create the coin data record or, for example (as a commercial bank), may hold ready coin data records created by a further entity (central bank). As a further alternative, an electronic coin data record $C_i$ of the requested value of the transaction is generated, with the desired monetary value u and a random number being linked as a concealment amount r (generated by a random number generator) for this purpose. A signed masked electronic coin data record with the signature of said device M2 (or the issuer entity 1) is transmitted to the monitoring entity 2 in step 611.

In step 612, it transmits (optically, electronically) the generated electronic coin data record $C_i$ to the device M1.

Within the scope of the invention, all elements described and/or drawn and/or claimed may be combined with one another as desired.

The invention claimed is:

1. A first device configured to directly transmit electronic coin data records to a second device, the first device comprising:
   a first computing unit being communicatively connected to a first data storage, the first data storage having an electronic coin data record; and
   an interface least providing a communication channel for outputting the at least one electronic coin data record from the first device to the second device; and
   wherein the first computing unit is configured to:
   mask the electronic coin data record in the first device by applying a homomorphic one-way function to the electronic coin data record to obtain a masked electronic coin data record for registering the masked electronic coin data record in a monitoring entity; and
   output the electronic coin data record to the second device by means of said interface, the electronic coin data record being invalidated for further transmission in conjunction with the first device after being output to the second device;
   wherein the first device is configured to transmit the electronic coin data record directly to the second device without using a network connection, the electronic coin data record being usable by the second device for subsequent transactions immediately after receipt of the electronic coin data record from the first device;
   wherein the electronic coin data record includes a monetary amount and a concealment amount;
   wherein said first computing unit masks a corresponding electronic coin data record to be switched as the electronic coin data record in order to obtain a corresponding masked electronic coin data record to be switched as the masked electronic coin data record which is registered in said monitoring entity;
   wherein the monitoring entity comprises a database in which masked electronic coin records are stored and in which the masked electronic coin data record is registered and from which a validity status of the masked electronic coin data record is derived, without recording the transmission of the electronic coin data record from the first device to the second device, such that the first device and the second device remain anonymous in the monitoring entity.

2. The first device according to claim 1, further comprising a receiving interface for receiving electronic coin data records, the receiving interface being one of:
   an electronic detection module of the first device configured to optoelectronically detect electronic coin data records represented in visual form;
   a protocol interface for wirelessly receiving electronic coin data records from the second device by means of a communication protocol for wireless communication; or
   a data interface for receiving electronic coin data records from the second device by means of an application.

3. The first device according to claim 1, further being operatively connected to an electronic safe module,
   wherein the safe module is configured to securely store the electronic coin data record.

4. The first device according to claim 1, wherein said first computing unit is further configured, depending on a specification for electronic coin data records stored in the device defined as a threshold value of the monetary amount for the electronic coin data records stored in the first device or depending on a denomination specification for electronic coin data records stored in the first device, to automatically transmit the electronic coin data record from the first device or into the first device in order to comply with said specification.

5. The first device according to claim 4, wherein, in order to comply with said specification, said first computing unit is further configured to:
   transmit the electronic coin data record from the first device to an electronic safe module or from said safe module to the first device; or
   transmit the electronic coin data record from an issuer entity to the first device or from the first device to said issuer entity.

6. The first device according to claim 3,
   wherein said first computing unit is configured to exchange electronic coin data records by the communication channel of said interface with the second device and only exchanges electronic coin data records with an issuer entity after successful authentication using said safe module.

7. The first device according to claim 1, further comprising a location recognition module configured to recognize a predefined location zone,
   wherein said first computing unit is further configured to perform at least one of the following special functions only in said predefined location zone:
   a specification-dependent automatic transmission of electronic coin data records,
   an exchange of electronic coin data records with an electronic safe module or an issuer entity, or
   a registration of masked electronic coin data records.

8. The first device according to claim 1, wherein said first computing unit is further configured to:
   detect a difference between a transferable monetary amount to be transmitted and the monetary amount of the stored electronic coin data record;

request an electronic coin data record having an equivalent monetary amount equal to the detected difference; and receive the requested electronic coin data record.

9. The first device according to claim 8, wherein said first computing unit is further configured to:

join the received electronic coin data record with the stored electronic coin data record and mask the electronic coin data record to be joined for registration at said monitoring entity, and transmit the joined electronic coin data record, the monetary amount of which corresponds to the transferable monetary amount to be transmitted; or transmit the stored and the received electronic coin data records, the monetary amounts of which together correspond to the transferable monetary amount to be transmitted, wherein the received electronic coin data record is optionally switched beforehand.

10. The first device according to claim 1, wherein said first computing unit is further configured to:

detect a surplus from a received monetary amount and a threshold value of a stored monetary amount for stored electronic coin data records;

cause said surplus to be credited to a bank account by splitting the electronic coin data record in order to obtain a first electronic partial coin data record and a second electronic partial coin data record and masking the first and second partial coin data records in order to obtain masked first and second electronic coin data records for registering at said monitoring entity.

11. The first device according to claim 1, further comprising a bank note module configured for inputting and outputting bank notes.

12. The first device according to claim 11, wherein the first device is a register terminal or an automat and is configured to output the monetary amount in parts as a bank note by means of said bank note module and in parts as an electronic coin data record by means of said interface.

13. The first device according to claim 12, wherein the part of the monetary amount to be output as an electronic coin data record is a first electronic partial coin data record of a split electronic coin data record.

14. The first device according to claim 11, wherein the first device is a register terminal or an automat and is configured to output the monetary amount in bank notes by means of the bank note module, wherein the first device receives a partial monetary amount of the monetary amount in the form of an electronic coin data record from the second device for this purpose.

15. The first device according to claim 1, further comprising at least one of:

a security element reading device configured to read a security element;

a random number generator; or bank interface to a bank with access to be authorized to a bank account.

16. The first device according to claim 1, wherein said first data storage is a shared data storage that can be accessed by the second device, the shared data storage defining an external data memory, wherein each of the first and second devices has an application, said application being configured to:

communicate with said monitoring entity to register electronic partial coin data records accordingly.

17. A method for directly transmitting electronic coin data records between a first device and a second device, said method comprising:

accessing the electronic coin data records, the electronic coin data records being stored in a first data storage communicatively connected to a first computing unit;

masking the electronic coin data record in the first device by applying a homomorphic one-way function to the electronic coin data record, via the first computing unit, to obtain a masked electronic coin data record for registering the masked electronic coin data record in a monitoring entity; and outputting the electronic coin data record from the first device to the second device using an interface, the interface having a communication channel;

wherein the electronic coin data record is invalidated for further transmission in conjunction with the first device after being output to the second device;

wherein the first device is configured to transmit the electronic coin data record directly to the second device without using a network connection, the electronic coin data record being usable by the second device for subsequent transactions immediately after receipt of the electronic coin data record from the first device wherein the second device is configured to generate a modified electronic coin data record using the electronic coin data record and mask the modified electronic coin data to obtain a masked modified electronic coin data record, and send a registration request for the masked modified electronic coin data record to the monitoring entity, the registration request comprising the masked modified electronic coin data record to be registered and a masked received electronic coin data record for validating the registration request to the monitoring entity;

wherein the monitoring entity comprises a database in which masked electronic coin records are stored and in which the masked electronic coin data record is registered and from which a validity status of the masked electronic coin data record is derived, without recording the transmission of the electronic coin data record from the first device to the second device, such that the first device and the second device remain anonymous in the monitoring entity.

18. A payment system for an exchange of monetary amounts, said payment system comprising:

a monitoring layer including a database which is a decentralized database in which masked electronic coin data records are stored and from which a validity status of the masked electronic coin data record is derived without recording a transmission of the masked electronic coin data record from a first device to a second device, such that the first device and the second device remain anonymous in the monitoring layer; and a direct transaction layer including the first device, the first device comprising:

a first computing unit being communicatively connected to a first data storage, the first data storage having an electronic coin data record; and an interface having a communication channel for outputting the electronic coin data record from the first device to the second device;

wherein the first computing unit is configured to mask the electronic coin data record in the first device by applying a homomorphic one-way function to the electronic coin data record to obtain a masked electronic coin data record for registering the masked electronic coin data record in a monitoring entity and output the electronic coin data record to the second device by means of said interface;

wherein the electronic coin data record is invalidated for further transmission in conjunction with the first device after being output to the second device;

wherein the first device is configured to transmit the electronic coin data record directly to the second device without using a network connection, the electronic coin data record being usable by the second device for subsequent transactions immediately after receipt of the electronic coin data record from the first device;

wherein the second device is configured to generate a modified electronic coin data record using the electronic coin data record and mask the modified electronic coin data to obtain a masked modified electronic coin data record, and send a registration request for the masked modified electronic coin data record to the monitoring entity, the registration request comprising the masked modified electronic coin data record to be registered and a masked received electronic coin data record for validating the registration request to the monitoring entity;

wherein the electronic coin data record includes a monetary amount and a concealment amount.

19. The payment system according to claim 18, wherein the first device is a register terminal or an automat and the second device is a terminal of a user.

20. The payment system according to claim 18, further comprising an issuer entity configured to generate an electronic coin data record, wherein said issuer entity provides a masked generated electronic coin data record with a signature and sends the masked generated electronic coin data record and the signature to said monitoring entity; or output an electronic coin data record to the first device or withdraw an electronic coin data record from the first device, in particular by debiting or crediting the monetary amount of the output or withdrawn electronic coin data record to or from a bank account of the first device.

21. The first device according to claim 1, wherein said first computing unit masks an electronic coin data record split into a first electronic partial coin data record and a second electronic partial coin data record in order to obtain a masked first electronic partial coin data record and a masked second electronic partial coin data record which is to be registered in said monitoring entity.

22. The first device according to claim 1, wherein said first computing unit masks an electronic partial coin data record to be joined out of a first and a second electronic coin data record as the electronic coin data record in order to obtain a masked coin data record to be joined as the masked electronic coin data record which is registered in said monitoring entity.

23. The first device according to claim 6, wherein the issuer entity only issues electronic coin data records to safe modules of devices and takes back electronic coin data records only from safe modules of devices.

* * * * *